United States Patent
Seo et al.

(10) Patent No.: US 12,425,156 B2
(45) Date of Patent: Sep. 23, 2025

(54) METHOD FOR CONTROL CHANNEL FOR REDCAP IN WIRELESS COMMUNICATION SYSTEM, AND TERMINAL USING SAME METHOD

(71) Applicant: LG ELECTRONICS INC., Seoul (KR)

(72) Inventors: Inkwon Seo, Seoul (KR); Jaehyung Kim, Seoul (KR); Seonwook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 403 days.

(21) Appl. No.: 17/998,108

(22) PCT Filed: Apr. 29, 2021

(86) PCT No.: PCT/KR2021/005489
§ 371 (c)(1),
(2) Date: Nov. 7, 2022

(87) PCT Pub. No.: WO2021/225336
PCT Pub. Date: Nov. 11, 2021

(65) Prior Publication Data
US 2023/0179357 A1    Jun. 8, 2023

(30) Foreign Application Priority Data

May 8, 2020   (KR) .......................... 10-2020-0055210

(51) Int. Cl.
*H04L 5/00*       (2006.01)
*H04W 72/232*   (2023.01)

(52) U.S. Cl.
CPC ......... *H04L 5/0048* (2013.01); *H04W 72/232* (2023.01)

(58) Field of Classification Search
CPC ... H04L 5/0048; H04L 5/0007; H04L 5/0051; H04L 5/0094; H04L 5/0053; H04L 1/00; H04L 25/02; H04W 72/232
See application file for complete search history.

(56) References Cited

U.S. PATENT DOCUMENTS

2018/0368116 A1   12/2018   Liao et al.
2019/0103941 A1*   4/2019   Seo .................... H04L 5/0053

FOREIGN PATENT DOCUMENTS

KR   2018-0130472   12/2018
WO   2019-096291    5/2019

OTHER PUBLICATIONS

PCT International Application No. PCT/KR2021/005489, International Search Report dated Aug. 6, 2021, 4 page.

(Continued)

*Primary Examiner* — Ayaz R Sheikh
*Assistant Examiner* — Tarell A Hampton
(74) *Attorney, Agent, or Firm* — LEE, HONG, DEGERMAN, KANG & WAIMEY

(57) ABSTRACT

The present specification provides a method and a device, in which a terminal receives at least one piece of control resource set (CORESET) configuration information in a wireless communication system, the method comprising: performing initial access with a base station; receiving the at least one piece of CORESET configuration information from the base station; and monitoring a physical control channel (PDCCH) on a CORESET configured on the basis of the at least one piece of CORESET configuration information, wherein a duration of the CORESET on the time axis includes four or more symbols.

10 Claims, 26 Drawing Sheets

Example of CCE indexing

(56) References Cited

OTHER PUBLICATIONS

Samsung, "DL Control Enhancements for URLLC," R1-1901066, 3GPP TSG RAN WG1 AH#1901, Jan. 2019, 7 pages.
Guangdong Oppo Mobile Telecom, "Impact on common channel reception to PDCCH design," R1-1713272, 3GPP TSG RAN WG1 Meeting #90, Aug. 2017, 7 pages.

* cited by examiner

Example of CCE indexing

Example of CCE indexing

FIG. 18 transmit the at least one CORESET setting
information to the terminal (a physical control
channel (PDCCH) is transmitted on
a CORESET configured based on the at least one
CORESET configuration information,
and the duration of the CORESET on the time
axis may be composed of four or more symbols) —S1810

METHOD FOR CONTROL CHANNEL FOR REDCAP IN WIRELESS COMMUNICATION SYSTEM, AND TERMINAL USING SAME METHOD

CROSS-REFERENCE TO RELATED APPLICATION(S)

This application is the National Stage filing under 35 U.S.C. 371 of International Application No. PCT/KR2021/005489, filed on Apr. 29, 2021, which claims the benefit of earlier filing date and right of priority to Korean Application No. 10-2020-0055210, filed on May 8, 2020, the contents of which are all hereby incorporated by reference herein in their entireties.

BACKGROUND OF THE DISCLOSURE

Field of the Disclosure

The present specification relates to wireless communication.

Related Art

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new radio access technology (new RAT or NR).

Meanwhile, in this specification, it is intended to provide a specific configuration for a control resource set (CORESET).

SUMMARY OF THE DISCLOSURE

Technical Solutions

According to an embodiment of the present specification, a method and apparatus for monitoring a physical control channel (PDCCH) on CORESET set based on CORESET setting information, where the duration of the CORESET on the time axis is composed of 4 or more symbols, are provided.

According to the present specification, resource shortage is solved, and communication efficiency of a device can be increased.

The effects that can be obtained through a specific example of the present specification are not limited to the effects listed above. For example, there may be various technical effects that a person having ordinary skill in the related art can understand or derive from the present specification. Accordingly, specific effects of the present specification are not limited to those explicitly described in the present specification, and may include various effects that can be understood or derived from the technical features of the present specification.

BRIEF DESCRIPTION OF THE DRAWINGS

FIG. 18 is a flowchart of a method of transmitting at least one COntrol REsource SET (CORESET) configuration information from the viewpoint of a base station, according to an embodiment of the present specification.

DESCRIPTION OF EXEMPLARY EMBODIMENTS

Figure 1:
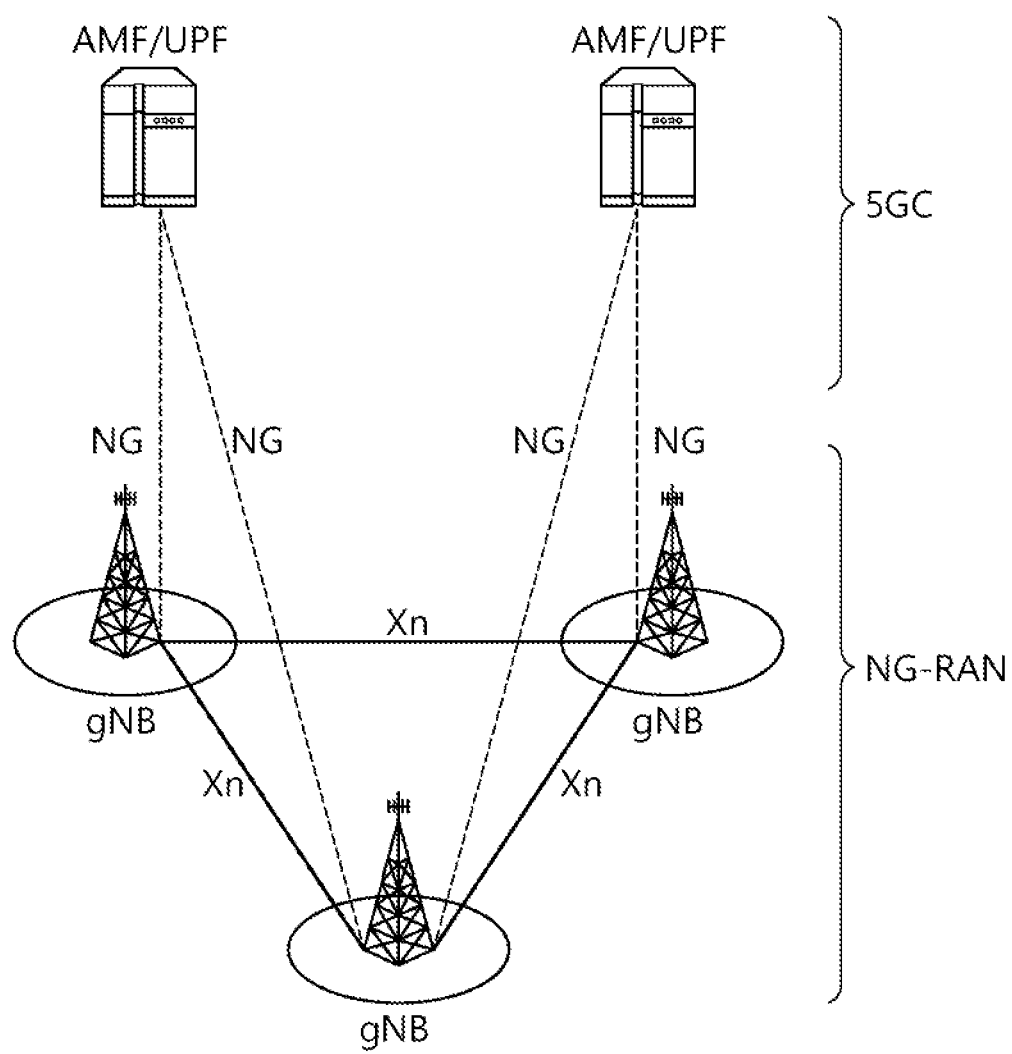
FIG. 1 illustrates a system structure of a new generation radio access network (NG-RAN) to which NR is applied.

In the present specification, "A or B" may mean "only A", "only B" or "both A and B". In other words, in the present specification, "A or B" may be interpreted as "A and/or B". For example, in this specification, "A, B or C" refers to "only A", "only B", "only C", or "any combination of A, B and C".

A forward slash (/) or comma used herein may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" can be interpreted the same as "at least one of A and B".

In addition, in the present specification, "at least one of A, B and C" means "only A", "only B", "only C", or "any combination of A, B and C". In addition, "at least one of A, B or C" or "at least one of A, B and/or C" can mean "at least one of A, B and C".

In addition, parentheses used in the present specification may mean "for example". Specifically, when described as "control information (PDCCH)", "PDCCH" may be proposed as an example of "control information". In other words, "control information" of the present specification is not limited to "PDCCH", and "PDCCH" may be suggested as an example of "control information". In addition, even when described as "control information (i.e., PDCCH)", "PDCCH" may be proposed as an example of "control information".

In the present specification, technical features that are individually described in one drawing may be implemented individually or at the same time.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

A PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transferred through a radio interface.

Data is moved between different PHY layers, that is, the PHY layers of a transmitter and a receiver, through a physical channel. The physical channel may be modulated according to an Orthogonal Frequency Division Multiplexing (OFDM) scheme, and use the time and frequency as radio resources.

The functions of the MAC layer include mapping between a logical channel and a transport channel and multiplexing and demultiplexing to a transport block that is provided through a physical channel on the transport channel of a MAC Service Data Unit (SDU) that belongs to a logical channel. The MAC layer provides service to a Radio Link Control (RLC) layer through the logical channel.

The functions of the RLC layer include the concatenation, segmentation, and reassembly of an RLC SDU. In order to guarantee various types of Quality of Service (QoS) required by a Radio Bearer (RB), the RLC layer provides three types of operation mode: Transparent Mode (TM), Unacknowledged Mode (UM), and Acknowledged Mode (AM). AM RLC provides error correction through an Automatic Repeat Request (ARQ).

The RRC layer is defined only on the control plane. The RRC layer is related to the configuration, reconfiguration, and release of radio bearers, and is responsible for control of logical channels, transport channels, and PHY channels. An RB means a logical route that is provided by the first layer (PHY layer) and the second layers (MAC layer, the RLC layer, and the PDCP layer) in order to transfer data between UE and a network.

The function of a Packet Data Convergence Protocol (PDCP) layer on the user plane includes the transfer of user data and header compression and ciphering. The function of the PDCP layer on the user plane further includes the transfer and encryption/integrity protection of control plane data.

What an RB is configured means a procedure of defining the characteristics of a wireless protocol layer and channels in order to provide specific service and configuring each detailed parameter and operating method. An RB can be divided into two types of a Signaling RB (SRB) and a Data RB (DRB). The SRB is used as a passage through which an RRC message is transmitted on the control plane, and the DRB is used as a passage through which user data is transmitted on the user plane.

If RRC connection is established between the RRC layer of UE and the RRC layer of an E-UTRAN, the UE is in the RRC connected state. If not, the UE is in the RRC idle state.

A downlink transport channel through which data is transmitted from a network to UE includes a broadcast channel (BCH) through which system information is transmitted and a downlink shared channel (SCH) through which user traffic or control messages are transmitted. Traffic or a control message for downlink multicast or broadcast service may be transmitted through the downlink SCH, or may be transmitted through an additional downlink multicast channel (MCH). Meanwhile, an uplink transport channel through which data is transmitted from UE to a network includes a random access channel (RACH) through which an initial control message is transmitted and an uplink shared channel (SCH) through which user traffic or control messages are transmitted.

Logical channels that are placed over the transport channel and that are mapped to the transport channel include a broadcast control channel (BCCH), a paging control channel (PCCH), a common control channel (CCCH), a multicast control channel (MCCH), and a multicast traffic channel (MTCH).

The physical channel includes several OFDM symbols in the time domain and several subcarriers in the frequency domain. One subframe includes a plurality of OFDM symbols in the time domain. An RB is a resources allocation unit, and includes a plurality of OFDM symbols and a plurality of subcarriers. Furthermore, each subframe may use specific subcarriers of specific OFDM symbols (e.g., the first OFDM symbol) of the corresponding subframe for a physical downlink control channel (PDCCH), that is, an L1/L2 control channel. A Transmission Time Interval (TTI) is a unit time for subframe transmission.

Hereinafter, a new radio access technology (new RAT, NR) will be described.

As a wider range of communication devices require larger communication capacities, the need for mobile broadband communication that is more enhanced than the existing Radio Access Technology (RAT) is rising. Additionally, massive Machine Type Communications (massive MCT), which connects multiple devices and objects so as to provide various services regardless of time and place, is also one of the most important issues that are to be considered in the next generation communication. Moreover, discussions are made on services/terminals (or user equipment (UE)) that are sensitive to reliability and latency. And, discussions are made on the adoption of a next generation radio access technology that is based on the enhanced mobile broadband communication, massive MTC, Ultra-Reliable and Low Latency Communication (URLLC), and so on. And, for convenience, the corresponding technology will be referred to as a new RAT or NR.

FIG. 1 illustrates a system structure of a new generation radio access network (NG-RAN) to which NR is applied.

Referring to FIG. 1, the NG-RAN may include a gNB and/or an eNB providing a user plane and a control plane protocol termination to a terminal. FIG. 1 illustrates a case of including only the gNB. The gNB and eNB are connected to each other by an Xn interface. The gNB and eNB are connected to a 5G Core Network (5GC) through an NG interface. More specifically, the gNB and eNB are connected to the access and mobility management function (AMF) through an NG-C interface and connected to a user plane function (UPF) through an NG-U interface.

Figure 2:
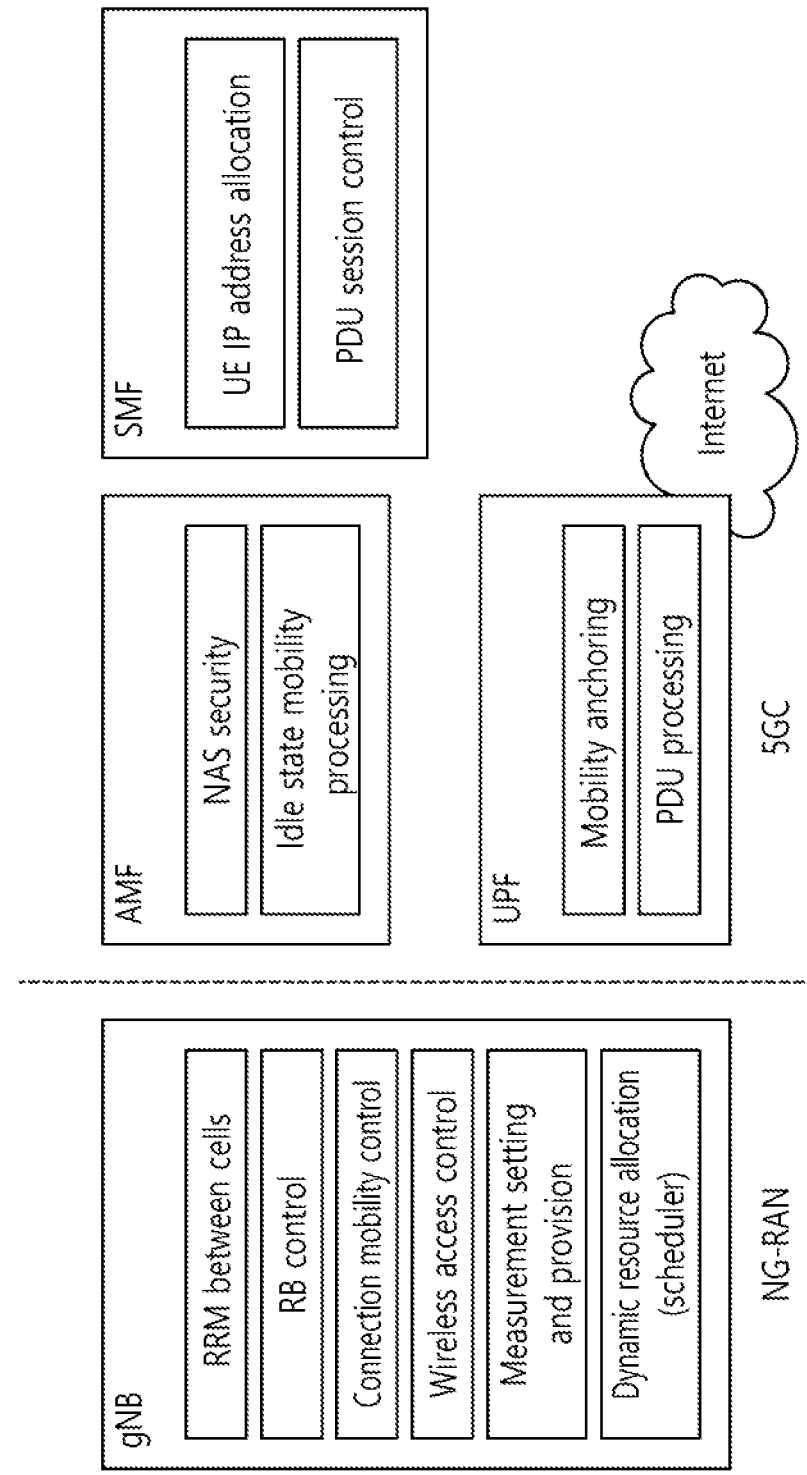
FIG. 2 illustrates functional partitioning between NG-RAN and 5GC.

FIG. 2 illustrates functional partitioning between NG-RAN and 5GC.

Referring to FIG. 2, the gNB may provide inter-cell radio resource management (RRM), radio bearer (RB) control, connection mobility control, radio access control, measurement configuration & provision, dynamic resource allocation, and the like. An AMF may provide functions such as NAS security, idle state mobility handling, and the like. A UPF may provide functions such as mobility anchoring, PDU handling, and the like. A session management function (SMF) may provide functions such as UE IP address allocation, PDU session control, and the like.

Figure 3:
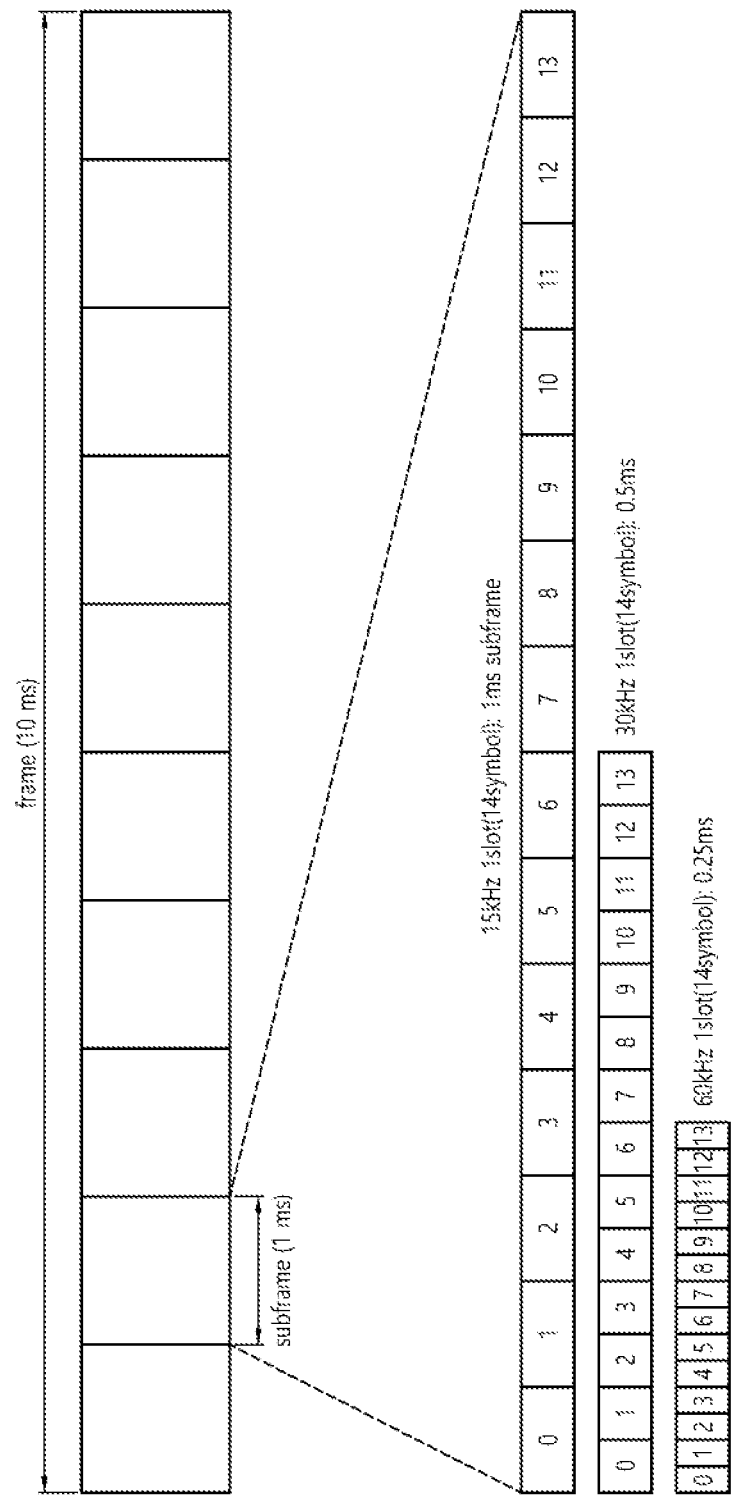
FIG. 3 illustrates a frame structure applicable in NR.

FIG. 3 illustrates a frame structure applicable in NR.

Referring to FIG. 3, a frame may consist of 10 milliseconds (ms) and may include 10 subframes of 1 ms.

A subframe may include one or a plurality of slots according to subcarrier spacing.

Table 1 below shows subcarrier spacing configuration.

TABLE 1

| µ | $\Delta f = 2^\mu \cdot 15[kHz]$ | CP(Cyclic Prefix) |
|---|---|---|
| 0 | 15 | Normal |
| 1 | 30 | Normal |
| 2 | 60 | Normal, Extended |

TABLE 1-continued

| µ | $\Delta f = 2^\mu \cdot 15[kHz]$ | CP(Cyclic Prefix) |
|---|---|---|
| 3 | 120 | Normal |
| 4 | 240 | Normal |

Table 2 below shows the number of slots in a frame ($N^{frame,\mu}_{slot}$), the number of slots in a subframe ($N^{subframe,\mu}_{slot}$), and the number of symbols in a slot ($N^{slot}_{symb}$) according to the subcarrier spacing configuration.

TABLE 2

| µ | $N^{slot}_{symb}$ | $N^{frame,\mu}_{slot}$ | $N^{subframe,\mu}_{slot}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

FIG. 3 shows µ=0, 1, and 2. A physical downlink control channel (PDCCH) may include one or more control channel elements (CCEs) as shown in Table 3 below.

TABLE 3

| Aggregation level | Number of CCEs |
|---|---|
| 1 | 1 |
| 2 | 2 |
| 4 | 4 |
| 8 | 8 |
| 16 | 16 |

In other words, the PDCCH may be transmitted through a resource including 1, 2, 4, 8 or 16 CCEs. Here, the CCE includes six resource element groups (REGs), and one REG includes one resource block in the frequency domain and one orthogonal frequency division multiplexing (OFDM) symbol in the time domain. Meanwhile, in the NR, a new unit called a control resource set (CORESET) may be introduced. A UE may receive the PDCCH in the CORESET.

Figure 4:
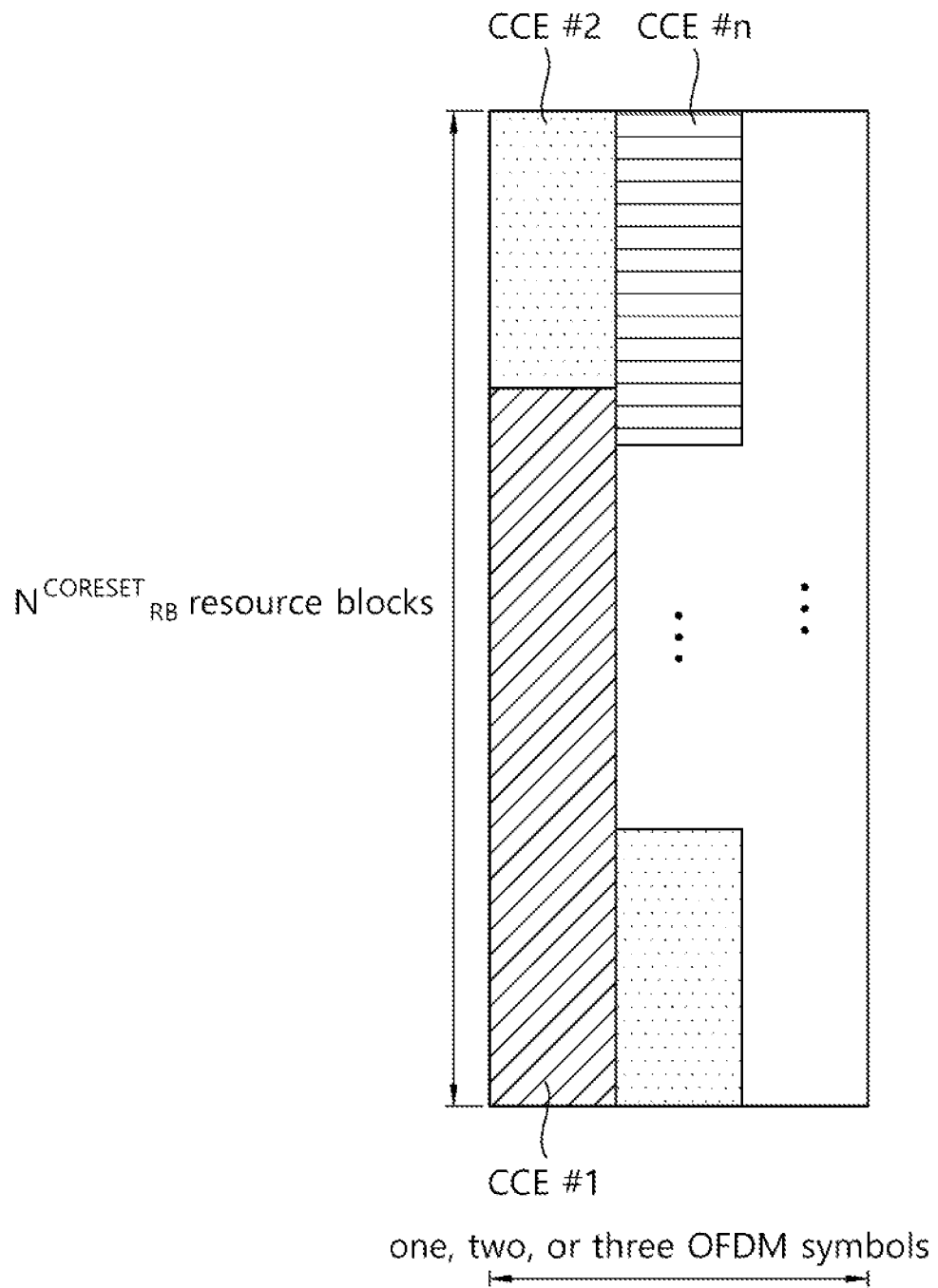
FIG. 4 illustrates a CORESET.

FIG. 4 illustrates a CORESET.

Referring to FIG. 4, the CORESET may include $N^{CORESET}_{RB}$ resource blocks in the frequency domain and $N^{CORESET}_{symb} \in \{1, 2, 3\}$ symbols in the time domain. $N^{CORESET}_{RB}$ and $N^{CORESET}_{symb}$ may be provided by a base station (BS) through higher layer signaling. As shown in FIG. 4, a plurality of CCEs (or REGs) may be included in the CORESET.

The UE may attempt to detect a PDCCH in units of 1, 2, 4, 8 or 16 CCEs in the CORESET. One or a plurality of CCEs for attempting PDCCH detection may be referred to as PDCCH candidates.

A plurality of CORESETs may be configured for the UE.

Figure 5:
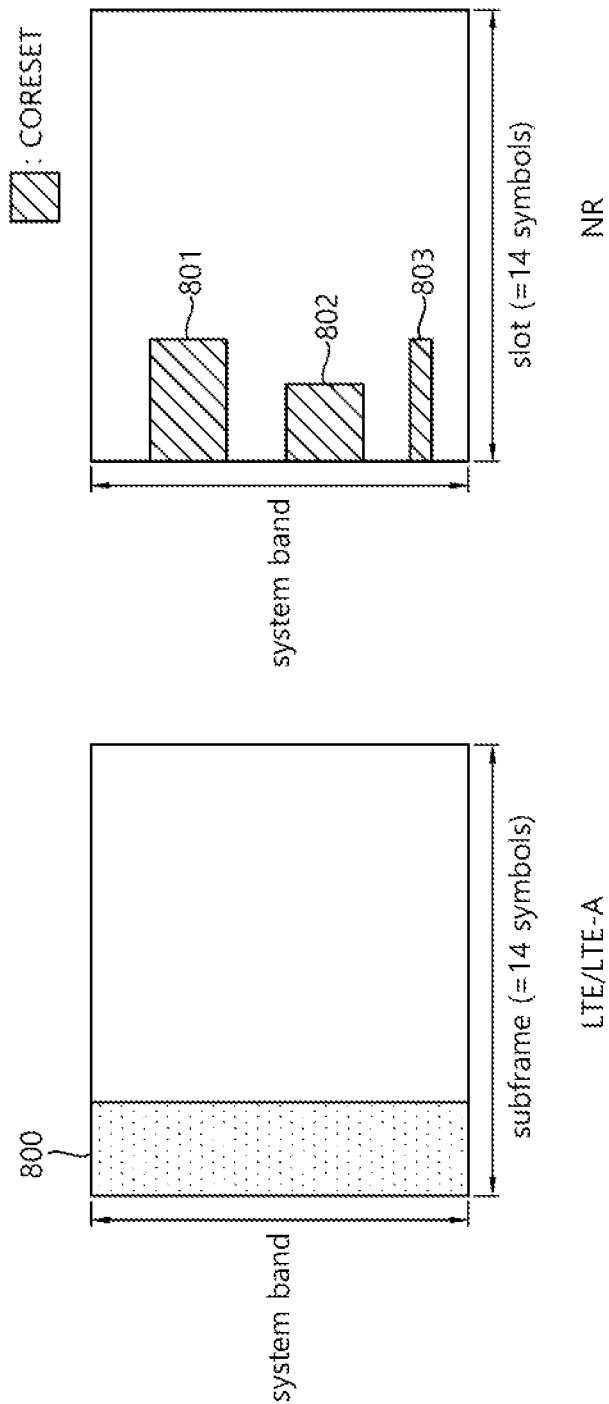
FIG. 5 is a view illustrating a difference between a legacy control region and a CORESET in the NR.

FIG. 5 is a view illustrating a difference between a legacy control region and a CORESET in the NR.

Referring to FIG. 5, a control region 800 in the legacy wireless communication system (e.g., LTE/LTE-A) is configured in the entire system band used by a BS. All terminals, excluding some UEs that support only a narrow band (e.g., eMTC/NB-IoT terminals), were supposed to be able to receive wireless signals of the entire system band of the BS in order to properly receive/decode control information transmitted from the BS.

Meanwhile, in the NR, the aforementioned CORESET was introduced. CORESETs (801, 802, 803) may be radio resources for control information that the UE should receive and may use only a part of the system band, not the entire system band. The BS may allocate the CORESET to each terminal, and may transmit control information through the allocated CORESET. For example, in FIG. 5, a first CORESET (801) may be allocated to UE 1, a second CORESET (802) may be allocated to UE 2, and a third CORESET (803) may be allocated to UE 3. The UE in the NR may receive the control information from the BS even if the UE does not necessarily receive the entire system band.

The CORESET may include a UE-specific CORESET for transmitting UE-specific control information and a common CORESET for transmitting control information common to all UEs.

Meanwhile, in the NR, high reliability may be required depending on an application field, and in this context, a target block error rate (BLER) for a downlink control information (DCI) transmitted through a downlink control channel (e.g., physical downlink control channel (PDCCH)) may be significantly lower than that of the related art. As an example of a method for satisfying the requirement for such high reliability, the amount of contents included in the DCI may be reduced and/or the amount of resources used in DCI transmission may be increased. Here, the resource may include at least one of a resource in the time domain, a resource in the frequency domain, a resource in a code domain, and a resource in a spatial domain.

The following technologies/characteristics may be applied to NR.

<Self-Contained Subframe Structure>

Figure 6:
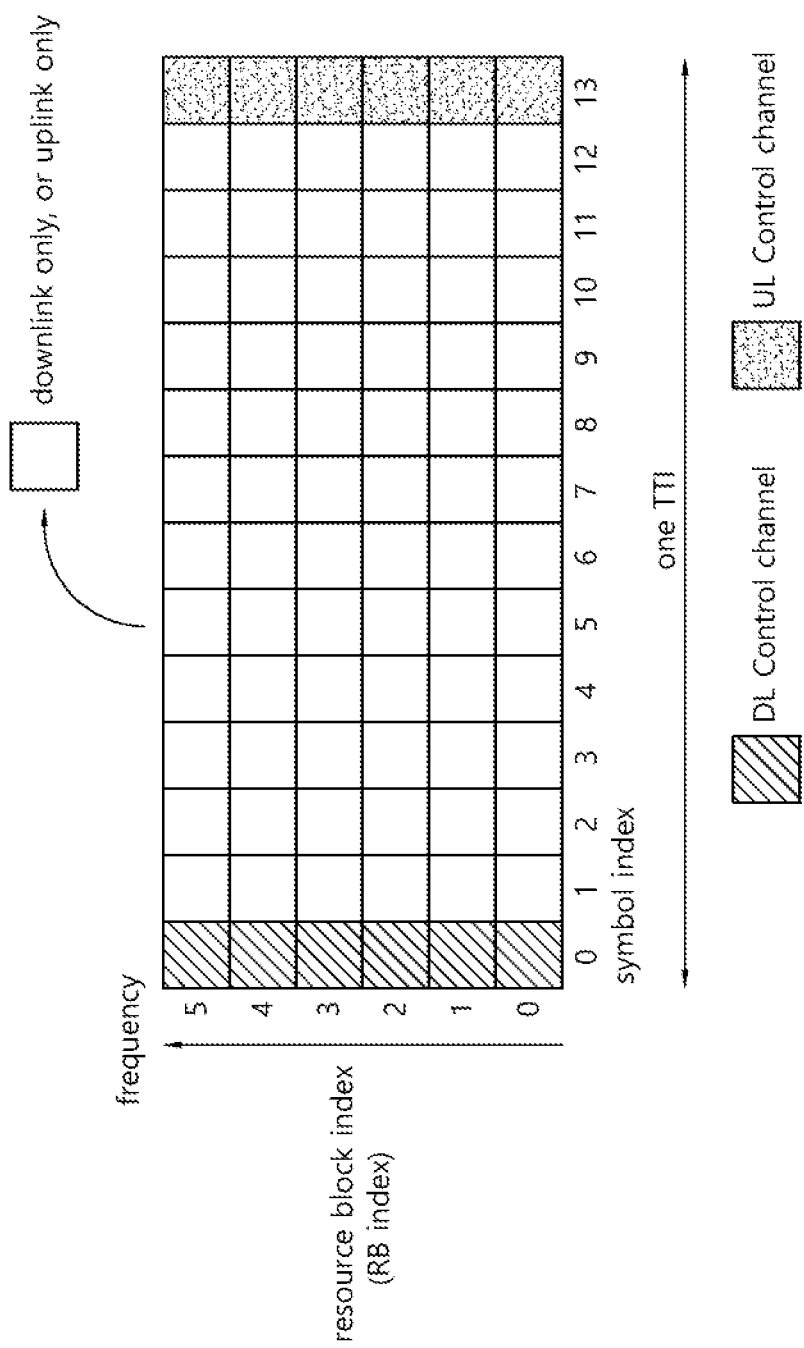
FIG. 6 illustrates an example of a frame structure for the new radio access technology (new RAT).

FIG. 6 illustrates an example of a frame structure for the new radio access technology (new RAT).

In NR, as a purpose for minimizing latency, as shown in FIG. 6, a structure having a control channel and a data channel being processed with Time Division Multiplexing (TDM), within one TTI, may be considered as one type of frame structure.

In FIG. 6, an area marked with slanted lines represents a downlink control area, and an area marked in black represents an uplink control area. An area marked in black may be used for downlink (DL) data transmission or may be used for uplink (UL) data transmission. The characteristic of such structure is that, since downlink (DL) transmission and uplink (UL) transmission are carried out sequentially, DL data is sent out (or transmitted) from a subframe, and UL Acknowledgement/Not-acknowledgement (ACK/NACK) may also be received in the subframe. As a result, time needed until data retransmission, when a data transmission error occurs, may be reduced, and, accordingly, latency in the final data transfer (or delivery) may be minimized.

In the above-described data and control TDMed subframe structure, a time gap is needed for a transition process (or shifting process) from a transmission mode to a reception mode of the base station and UE, or a transition process (or shifting process) from a reception mode to a transmission mode of the base station and UE. For this, in a self-contained subframe structure, some of the OFDM symbols of a time point where a transition from DL to UL occurs may be configured as a guard period (GP).

<Analog Beamforming #1>

In a Millimeter Wave (mmW), since the wavelength becomes short, installation of multiple antenna elements on a same surface becomes possible. That is, on a 30 GHz band, the wavelength is 1cm, thereby enabling installation of a total of 100 antenna elements to be performed on a 5 by 5 cm panel in a 2-dimension (2D) alignment format at intervals of 0.5 wavelength (lambda). Therefore, in mmW, coverage shall be extended or throughput shall be increased by increasing beamforming (BF) gain using multiple antenna elements.

In this case, when a Transceiver Unit (TXRU) is provided so as to enable transport power and phase adjustment to be performed per antenna element, independent beamforming per frequency resource may be performed. However, there lies a problem of reducing effectiveness in light of cost in case of installing TXRU to all of the 100 or more antenna elements. Therefore, a method of mapping multiple antenna elements to one TXRU and adjusting beam direction by using an analog phase shifter is being considered. Since such analog beamforming method can only form a single beam direction within a full band, it is disadvantageous in that in cannot provide frequency selective beamforming.

As an intermediate form of digital beamforming (digital BF) and analog beamforming (analog BF), hybrid beamforming (hybrid BF) having B number of TXRUs, which is less than Q number of antenna elements, may be considered. In this case, although there are differences according to connection methods between the B number of TXRUs and the Q number of antenna elements, a direction of a beam that may be transmitted simultaneously shall be limited to B or below.

<Analog Beamforming #2>

In an NR system, in case multiple antennas are used, the usage of a hybrid beamforming method, which is a combination of digital beamforming and analog beamforming, is rising. At this point, analog beamforming is advantageous in that it performs precoding (or combining) at an RF end, thereby reducing the number of RF chains and the number of D/A (or A/D) converters as well as achieving a performance that is proximate to digital beamforming. For simplicity, the hybrid beamforming structure may be expressed as N number of TXRUs and M number of physical channels. Accordingly, digital beamforming for L number of data layers that are to be transmitted by the transmitter may be expressed as an N by L matrix. Then, after the converted N number of digital signals pass through the TXRU so as to be converted to analog signals, analog beamforming, which is expressed as an M by N matrix, is applied thereto.

Figure 7:
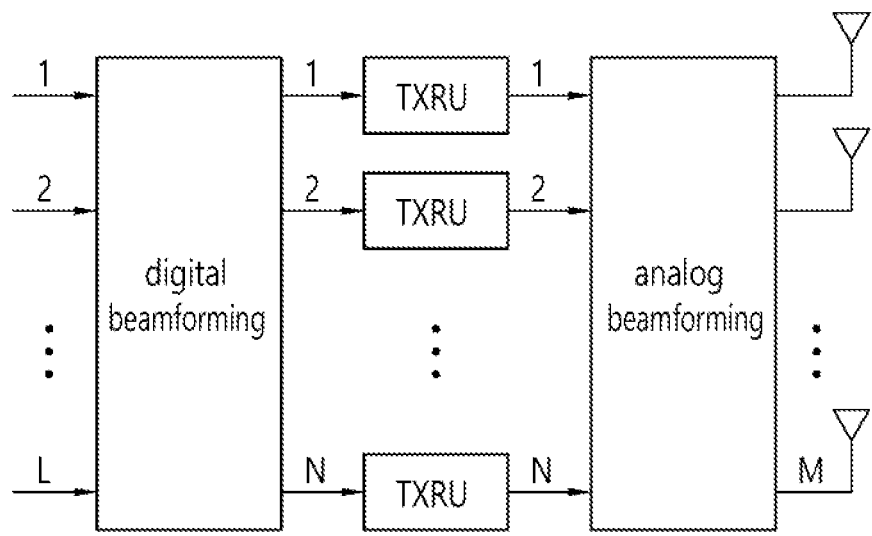
FIG. 7 is an abstract diagram of a hybrid beamforming structure in the viewpoints of the TXRU and physical antenna.

FIG. 7 is an abstract diagram of a hybrid beamforming structure in the viewpoints of the TXRU and physical antenna.

In FIG. 7, a number of digital beams is equal to L, and a number of analog beams is equal to N. Moreover, NR systems are considering a solution for supporting more efficient beamforming to a UE, which is located in a specific area, by designing the base station to be capable of changing beamforming to symbol units. Furthermore, in FIG. 7, when specific N number of TXRUs and M number of RF antennas are defined as a single antenna panel, a solution of adopting multiple antenna panels capable of having independent hybrid beamforming applied thereto is being considered in the NR system.

As described above, in case the base station uses multiple analog beams, since the analog beams that are advantageous for signal reception per UE may vary, for at least the synchronization signal, system information, paging, and so on, a beam sweeping operation is being considered. Herein, the beam sweeping operation allows the multiple analog beams that are to be applied by the base station to be changed per symbol so that all UEs can have reception opportunities.

Figure 8:
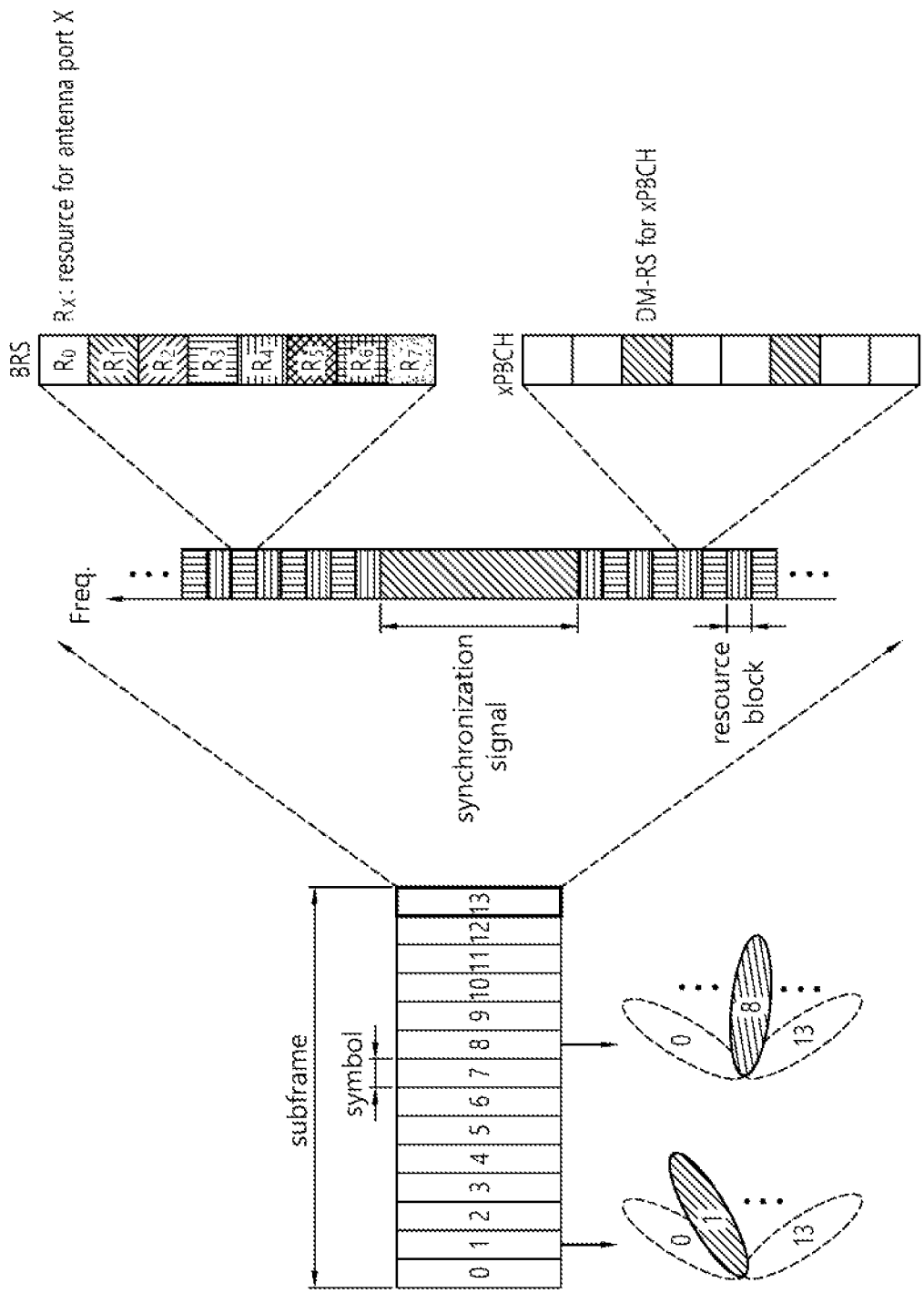
FIG. 8 is a schematic diagram of the beam sweeping operation for a synchronization signal and system information during a downlink (DL) transmission process.

FIG. 8 is a schematic diagram of the beam sweeping operation for a synchronization signal and system information during a downlink (DL) transmission process.

In FIG. 8, a physical resource (or physical channel) through which system information of the NR system is being transmitted by a broadcasting scheme is referred to as a physical broadcast channel (xPBCH). At this point, analog beams belonging to different antenna panels within a single symbol may be transmitted simultaneously. And, in order to measure a channel per analog beam, as shown in FIG. 8, a solution of adopting a beam reference signal (beam RS, BRS), which is a reference signal (RS) being transmitted after having a single analog beam (corresponding to a specific antenna panel) applied thereto. The BRS may be defined for multiple antenna ports, and each antenna port of the BRS may correspond to a single analog beam. At this point, unlike the BRS, a synchronization signal or xPBCH may be transmitted, after having all analog beams within an analog beam group applied thereto, so as to allow a random UE to successfully receive the signal.

Figure 9:
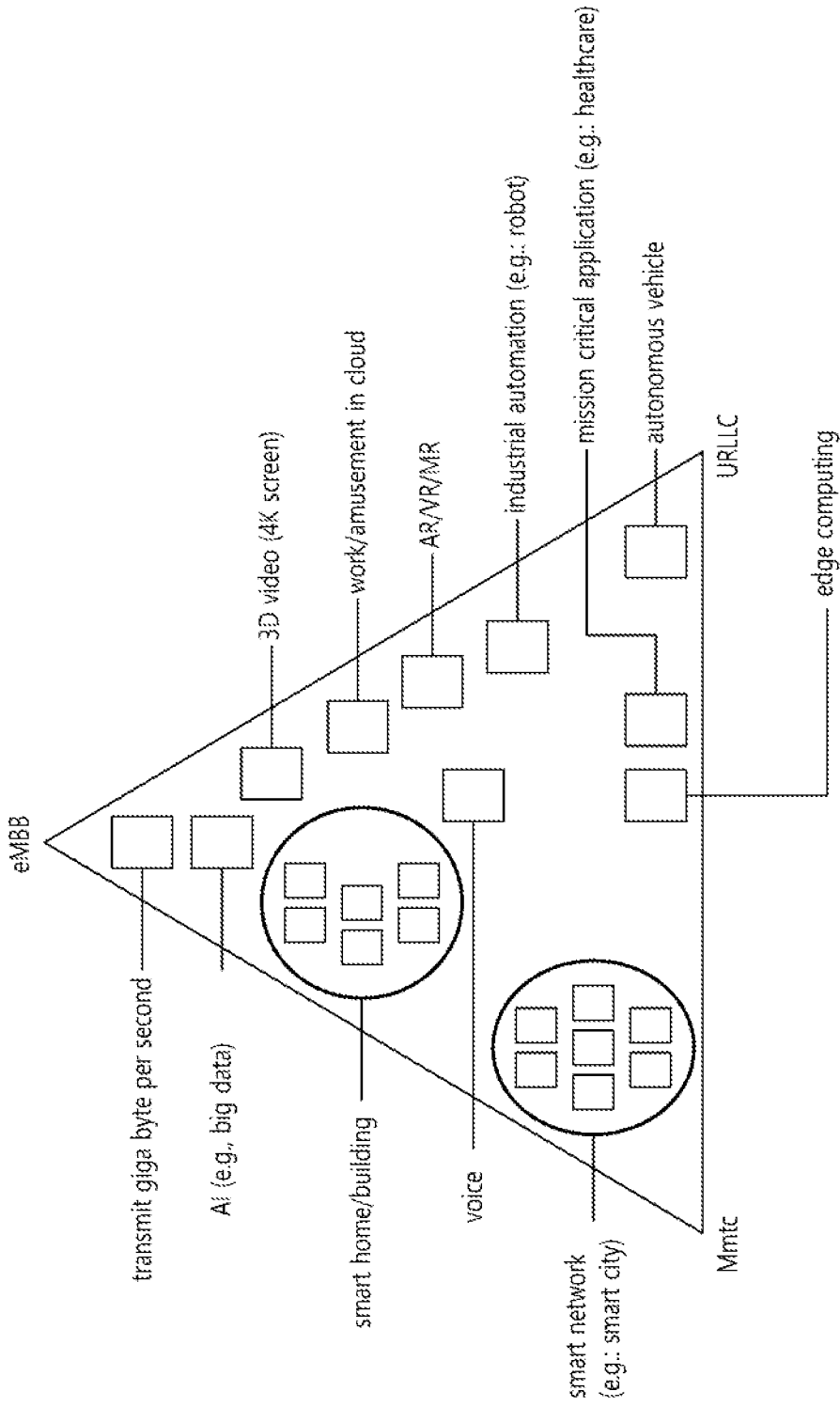
FIG. 9 shows examples of 5G usage scenarios to which the technical features of the present specification can be applied.

FIG. 9 shows examples of 5G usage scenarios to which the technical features of the present specification can be applied. The 5G usage scenarios shown in FIG. 9 are only exemplary, and the technical features of the present specification can be applied to other 5G usage scenarios which are not shown in FIG. 9.

Referring to FIG. 9, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km$^2$. mMTC allows seamless integration of embedded sensors in all areas and is one of the most widely used 5G applications. Potentially by 2020, IoT devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drone control and coordination.

Next, a plurality of use cases included in the triangle of FIG. 9 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g., devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time HD video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location-based information systems. Use cases of logistics and freight tracking typically require low data rates, but require a large range and reliable location information.

Hereinafter, a discussion related to power saving will be described.

The terminal's battery life is a factor of the user experience that influences the adoption of 5G handsets and/or services. Power efficiency for 5G NR terminals is not worse than at least LTE, and a study of terminal power consumption may be provided in order to identify and apply techniques and designs for improvement.

ITU-R defines energy efficiency as one of the minimum technical performance requirements of IMT-2020. According to the ITU-R report, e.g. the minimum requirements related to the technical performance of the IMT-2020 air interface, the energy efficiency of a device can be related to support for two aspects: a) efficient data transmission in the loaded case, b) low energy consumption when there is no data. Efficient data transmission in the loaded case is demonstrated by average spectral efficiency. In the absence of data, low energy consumption can be estimated by the sleep rate.

Since the NR system can support high-speed data transmission, it is expected that user data will be burst and serviced for a very short period of time. One efficient terminal power saving mechanism is to trigger the terminal for network access from the power efficiency mode. Unless there is information about network access through the terminal power saving framework, the terminal maintains a power efficiency mode such as a micro-sleep or OFF period within a long DRX period. Instead, when there is no traffic to be transmitted, the network may support the terminal to switch from the network access mode to the power saving mode (e.g., dynamic terminal switching to sleep with a network support signal).

In addition to minimizing power consumption with a new wake-up/go-to-sleep mechanism, it may be provided to reduce power consumption during network access in RRC_CONNECTED mode. In LTE, more than half of the power consumption of the terminal occurs in the connected mode. Power saving techniques should focus on minimizing the main factors of power consumption during network access, including processing of aggregated bandwidth, dynamic number of RF chains and dynamic transmission/reception time and dynamic switching to power efficiency mode. In most cases of LTE field TTI, there is no data or there is little data, so a power saving scheme for dynamic adaptation to other data arrivals should be studied in the RRC-CONNECTED mode. Dynamic adaptation to traffic of various dimensions such as carrier, antenna, beamforming and bandwidth can also be studied. Further, it is necessary to consider how to enhance the switching between the network connection mode and the power saving mode. Both network-assisted and terminal-assisted approaches should be considered for terminal power saving mechanisms.

The terminal also consumes a lot of power for RRM measurement. In particular, the terminal must turn on the power before the DRX ON period for tracking the channel to prepare for RRM measurement. Some of the RRM measurement is not essential, but consumes a lot of terminal power. For example, low mobility terminals do not need to be measured as frequently as high mobility terminals. The network may provide signaling to reduce power consumption for RRM measurement, which is unnecessary for the terminal. Additional terminal support, for example terminal state information, etc., is also useful for enabling the network to reduce terminal power consumption for RRM measurement.

Accordingly, there is a need for research to identify the feasibility and advantages of a technology that enables the implementation of a terminal capable of operating while reducing power consumption.

Hereinafter, UE power saving schemes will be described.

For example, the terminal power saving techniques may consider a power saving signal/channel/procedure for triggering terminal adaptation to traffic and power consumption characteristics, adaptation to frequency changes, adaptation to time changes, adaptation to the antenna, adaptation to the DRX configuration, adaptation to terminal processing capabilities, adaptation to obtain PDCCH monitoring/decoding reduction, terminal power consumption adaptation and a reduction in power consumption in RRM measurement.

Regarding adaptation to the DRX configuration, a downlink shared channel (DL-SCH) featuring support for terminal discontinuous reception (DRX) for enabling terminal power saving, PCH featuring support for terminal DRX enabling terminal power saving (here, the DRX cycle may be indicated to the terminal by the network) and the like may be considered.

Regarding adaptation to the terminal processing capability, the following techniques may be considered. When requested by the network, the terminal reports at least its static terminal radio access capability. The gNB may request the ability of the UE to report based on band information. If allowed by the network, a temporary capability limit request may be sent by the terminal to signal the limited availability of some capabilities (e.g., due to hardware sharing, interference or overheating) to the gNB. Thereafter, the gNB can confirm or reject the request. Temporary capability limitations must be transparent to 5GC. That is, only static functions are stored in 5GC.

Regarding adaptation to obtain PDCCH monitoring/decoding reduction, the following techniques may be considered. The UE monitors the PDCCH candidate set at a monitoring occasion configured in one or more CORESETs configured according to a corresponding search space configuration. CORESET consists of a set of PRBs having a time interval of 1 to 3 OFDM symbols. Resource units REG and CCE are defined in CORESET, and each CCE consists of a set of REGs. The control channel is formed by a set of CCEs. Different code rates for the control channel are implemented by aggregating different numbers of CCEs. Interleaved and non-interleaved CCE-REG mapping is supported in CORESET.

Regarding the power saving signal/channel/procedure for triggering terminal power consumption adaptation, the following technique may be considered. In order to enable reasonable terminal battery consumption when carrier aggregation (CA) is configured, an activation/deactivation mechanism of cells is supported. When one cell is deactivated, the UE does not need to receive a corresponding PDCCH or PDSCH, cannot perform a corresponding uplink transmission, and does not need to perform a channel quality indicator (CQI) measurement. Conversely, when one cell is activated, the UE must receive the PDCH and PDCCH (if the UE is configured to monitor the PDCCH from this SCell), and is expected to be able to perform CQI measurement. The NG-RAN prevents the SCell of the secondary PUCCH group (the group of SCells in which PUCCH signaling is associated with the PUCCH of the PUCCH SCell) from being activated while the PUCCH SCell (secondary cell composed of PUCCH) is deactivated. The NG-RAN causes the SCell mapped to the PUCCH SCell to be deactivated before the PUCCH SCell is changed or removed.

When reconfiguring without mobility control information, the SCell added to the set of serving cells is initially deactivated, and the (unchanged or reconfigured) SCells remaining in the set of serving cells do not change the activate state (e.g. active or inactive).

SCells are deactivated when reconfiguring with mobility control information (e.g., handover).

In order to enable reasonable battery consumption when BA (bandwidth adaptation) is configured, only one uplink BWP and one downlink BWP or only one downlink/uplink BWP pair for each uplink carrier may be activated at once in the active serving cell, and all other BWPs configured in the terminal are deactivated. In deactivated BWPs, the UE does not monitor the PDCCH and does not transmit on the PUCCH, PRACH and UL-SCH.

For BA, the terminal's reception and transmission bandwidth need not be as wide as the cell's bandwidth and can be adjusted: the width can be commanded to change (e.g. shrink during periods of low activity to save power), position in the frequency domain can be moved (e.g. to increase scheduling flexibility), the subcarrier spacing can be ordered to change (e.g., to allow different services). A subset of the total cell bandwidth of a cell is referred to as a bandwidth part (BWP), the BA is obtained by configuring the BWP(s) to the UE and knowing that it is currently active among the BWPs configured to the UE. When the BA is configured, the terminal only needs to monitor the PDCCH on one active BWP. That is, there is no need to monitor the PDCCH on the entire downlink frequency of the cell. The BWP inactive timer (independent of the DRX inactive timer described above) is used to convert the active BWP to the default BWP: tyhe timer is restarted when the PDCCH decoding succeeds, switching to the default BWP occurs when the timer expires.

Figure 10:
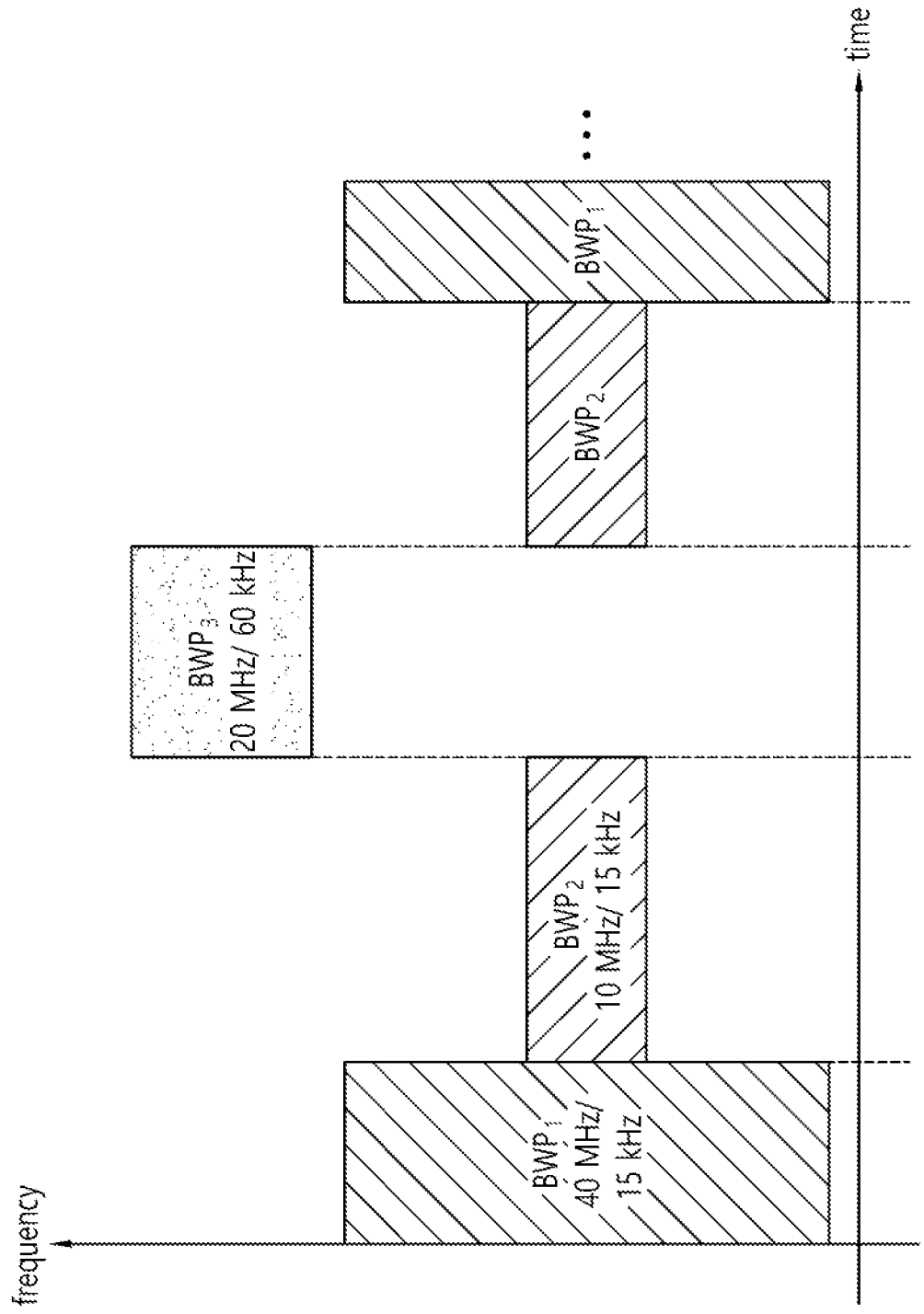
FIG. 10 illustrates a scenario in which three different bandwidth parts are configured.

FIG. 10 illustrates a scenario in which three different bandwidth parts are configured.

FIG. 10 shows an example in which BWP1, BWP2, and BWP3 are configured on time-frequency resources. BWP1 has a width of 40 MHz and a subcarrier spacing of 15 kHz, BWP2 has a width of 10 MHz and a subcarrier spacing of 15 kHz, and BWP3 may have a width of 20 MHz and a subcarrier spacing of 60 kHz. In other words, each of the bandwidth parts may have different widths and/or different subcarrier spacings.

The following techniques can be used in various radio access systems such as CDMA, FDMA, TDMA, OFDMA, SC-FDMA, and the like. CDMA may be implemented with a radio technology such as Universal Terrestrial Radio Access (UTRA) or CDMA2000. TDMA may be implemented with a radio technology such as Global System for Mobile communications (GSM)/General Packet Radio Service (GPRS)/Enhanced Data Rates for GSM Evolution (EDGE). OFDMA may be implemented with a radio technology such as IEEE 802.11 (Wi-Fi), IEEE 802.16 (WiMAX), IEEE 802-20, Evolved UTRA (E-UTRA), and the like. UTRA is part of the Universal Mobile Telecommunications System (UMTS). 3GPP (3rd Generation Partnership Project) Long Term Evolution (LTE) is a part of Evolved UMTS (E-UMTS) using E-UTRA and LTE-A (Advanced)/LTE-A pro is an evolved version of 3GPP LTE. 3GPP NR (New Radio or New Radio Access Technology) is an evolved version of 3GPP LTE/LTE-A/LTE-A pro.

For clarity of explanation, description is based on a 3GPP communication system (e.g., LTE-A, NR), but the technical spirit of the present specification is not limited thereto. LTE refers to technology after 3GPP TS 36.xxx Release 8. In detail, LTE technology after 3GPP TS 36.xxx Release 10 is referred to as LTE-A, and LTE technology after 3GPP TS 36.xxx Release 13 is referred to as LTE-A pro. 3GPP NR refers to technology after TS 38.xxx Release 15. LTE/NR may be referred to as a 3GPP system. "xxx" stands for standard document detail number. LTE/NR may be collectively referred to as a 3GPP system. For background art, terms, abbreviations, etc. used in the description of this specification, reference may be made to matters described in standard documents published before this specification.

Hereinafter, the proposal of the present specification will be described in more detail.

Additional advantages, objects, and features of this specification will be set forth in part in the description that follows, and will become apparent to those skilled in the art upon review of the following, or may be learned, in part, from the practice of the specification. The objects and other advantages of the present specification may be realized and attained by means of the appended drawings as well as the appended claims and the structures particularly pointed out in the claims.

In the Rel-17 NR system, research on a REDCAP (Reduced Capability) device will be conducted. The REDCAP terminal may have a higher requirement than the existing LPWA (Low Power Wide Area, i.e., LTE-M/NB IOT) terminal, a lower requirement may be set compared to the URLLC/eMBB terminal. Research on reduced number of UE Rx/Tx antenna (antenna), UE bandwidth (bandwidth) reduction (reduction), half-duplex (half-duplex) FDD, relaxed (relaxed) UE processing (processing) time/capability, etc. are planned for REDCAP. In the present specification, a control channel design for responding to a scheme that may cause a resource shortage, such as UE bandwidth reduction and a reduced antenna, is proposed.

Control channel transmission and reception in the NR system is performed based on blind decoding on resources set by CORESET and a search space set. CORESET defines the resource area and characteristics in which the control channel can be transmitted, in the resource domain, the size and location of CORESET in the frequency domain and the size of CORESET in the time domain (the location of CORESET in the time domain is determined by a search space set) is given by the network. REG bundle (bundle) interleaving (interleaving) whether or not, REG bundle size, interleaving related parameters, precoder (precoder) granularity, antenna port quasi co-location information, DMRS scrambling (scrambling) information, etc. may be indicated as a characteristic of the resource region.

On the other hand, as described above, the UE may monitor the PDCCH candidate set at a monitoring opportunity set in one or more set CORESET (control resource set) according to the corresponding search space configuration (configuration).

CORESET may consist of a PRB set having a time duration of 1 to 3 OFDM symbols. A resource element group (REG) and a control channel element (CCE) may be defined in CORESET together with each CCE composed of a set of REGs. The control channel may be formed by aggregation of CCEs. Different code rates for the control channel can be realized by aggregating different numbers of CCEs. Interleaved and non-interleaved CCE-to-REG mapping may be supported in CORESET.

Here, polar coding may be used for the PDCCH. In addition, each resource element group carrying the PDCCH may carry its own DMRS. Meanwhile, QPSK modulation may be used for PDCCH.

CORESET may be determined, for example, as follows.

The control resource set (CORESET) may be composed of $N\_RB^{CORESET}$ resource blocks in the frequency domain and $N\_symb^{CORESET} \in \{1,2,3\}$ symbols in the time domain.

The CCE consists of six resource-element groups (REGs), where the REG may be equal to one resource block during one OFDM symbol. REGs in CORESET are numbered in ascending order in a time-first manner, and may start from 0 for the first OFDM symbol and lowest-numbered resource block of CORESET.

A UE may consist of multiple CORESETs. Each CORESET can be connected to only one CCE-REG mapping. The CCE-REG mapping to CORESET may be interleaved or non-interleaved and may be described as a REG bundle.

On the other hand, in the case of CORESET configured by ControlResourceSet IE (transmitted through higher layer signaling (e.g. RRC signaling):

$N\_RB^{CORESET}$ may be provided by the higher layer parameter 'frequencyDomainResources'.

$N\_symb^{CORESET}$ may be provided as a higher layer parameter 'duration'. Here, $N\_symb^{CORESET}=3$ may be supported only when the upper layer parameter 'dmrs-TypeA-Position' is 3.

Interleaved or non-interleaved mapping may be provided by the higher layer parameter 'cce-REG-Mapping-Type'.

L is 6 in the case of non-interleaved mapping, and may be provided by the higher layer parameter 'reg-BundleSize' in the case of interleaved mapping.

R may be provided by the upper layer parameter 'interleaverSize'.

$n\_shift \in \{0, 1, \ldots, 274\}$ is provided by the upper layer parameter 'shiftIndex' (if provided), otherwise $n\_shift=N\_ID^{cell}$.

For both interleaved and non-interleaved mappings, the UE:

If the upper layer parameter 'precoderGranularity' is equal to 'sameAsREG-bundle', the same precoding can be used within the REG bundle;

The same precoding is used for all resource element groups within a set of contiguous resource blocks of CORESET, when the upper layer parameter 'precoderGranularity' is equal to 'allContiguousRB', the resource element of CORESET may not overlap with the SSB or LTE cell-specific reference signal indicated by the higher layer parameter 'lte-CRS-ToMatchAround' or 'additionalLTE-CRS-ToMatchAroundList'.

For CORESET 0 configured by ControlResourceSetZero IE:

The UE may assume a normal cyclic prefix (CP) when CORESET 0 is configured by MIB or SIB 1.

The UE may assume that the same precoding is being used within the REG bundle.

A resource unit for control channel transmission is defined as REG, REG bundle, CCE, etc., 1 CCE=6 REG, one REG is defined as 1 symbol in the time domain and 1 resource block (RB) in the frequency domain. One candidate to which the actual PDCCH can be transmitted may consist of 1, 2, 4, 8, 16 CCEs, in the case of 1-symbol CORESET, a transmission bandwidth of 96 RB (=about 20 MHz) is required to transmit the PDCCH of an aggregation level (AL) 16, in the case of 2- and 3-symbol CORESET, transmission bandwidths of 48 RB and 32 RB are required to transmit the AL16 PDCCH. On the other hand, the REDCAP terminal can operate with a transmission bandwidth of at least 5 MHz or 10 MHz due to bandwidth reduction, the maximum bandwidth may also be limited to about 20 MHz, this means that transmission of a higher AL PDCCH may be difficult with the current CORESET configuration. Additionally, in the case of a REDCAP terminal, a higher aggregation level may be required compared to the existing eMBB/URLLC terminal in order to compensate for coverage degradation due to reduced capability. In the present specification, a method for solving the above problems is proposed. As an example, it is proposed to lower the density of RS or increase the duration of CORESET in the time domain in order to lower the coding rate of the control channel.

The examples below may be implemented alone or in combination. That is, the examples below may be operated in combination with each other, unless the combination is not possible. In addition to this, in the examples below, an operation is not necessarily performed when the examples are combined, but a separate operation may be performed for each example.

I. Example #1: Front-loaded DMRS

In the Rel-15 and Rel-16 NR systems, a reference signal (RS) for demodulation of the control channel is located in all REGs, it is defined to be mapped to REs corresponding to #1, #5, #9 (starting from #0) within REG. This means that 25% of the total resource is used for RS transmission, when the channel condition is good, unnecessary resource waste may be caused, and channel estimation complexity may increase.

On the other hand, the front-loaded DMRS is a method of mapping RS only to the REG corresponding to the first symbol among REGs transmitted from the same RB, when the coherent time is about 3 symbol(s), channel estimation performance similar to that of a full loaded DMRS can be expected. In this way, when front-loaded DMRS is used, the number of REs to which information is mapped increases by about 16.7% in 2-symbol CORESET, in the case of 3-symbol CORESET, the number of REs to which information is mapped increases by about 22%, this means that the coding rate of control information is lowered. Therefore, in this specification, it is proposed to use the front-loaded DMRS in the control channel transmitted to the REDCAP terminal.

Figure 11:
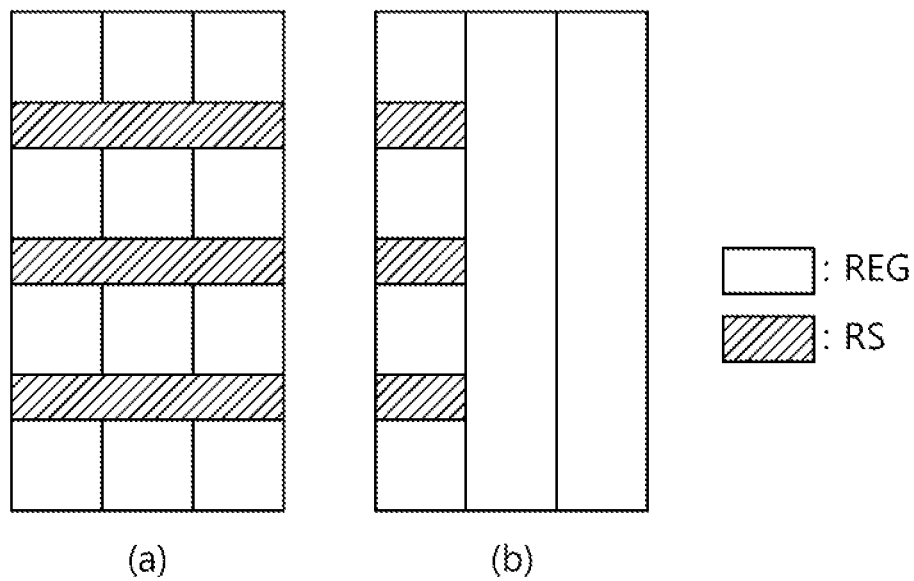
FIG. 11 shows an example of RS mapping for one RB in a 3-symbol CORESET.

FIG. 11 shows an example of RS mapping for one RB in a 3-symbol CORESET.

Here, (a) of FIG. 11 shows a full-loaded DMRS, and (b) of FIG. 11 shows a front-loaded DMRS, respectively.

Alternatively, RS mapping may be divided into i) a first type in which RS is allocated to a first number of symbols, and ii) a second type in which RS is allocated to a second number of symbols for one RB in CORESET. For example, the first number may be three as shown in (a) of FIG. 11, and the second number may be one as shown in (b) of FIG. 11. However, this is only an example, and if the number of symbols constituting CORESET is N, the first number can be generalized as N1 and the second number is N2 (N is a natural number, N1, N2 is a natural number equal to or less than N)).

In addition, the DMRS type may be determined according to the channel condition between each REDCAP terminal and the base station. For example, when the channel changes rapidly in the time domain, the channel estimation performance of the front-loaded DMRS may decrease, so it may be preferable to use the full-loaded DMRS in the corresponding situation. Therefore, in this specification, it is proposed that the control channel DMRS type (ie, front-loaded/full-loaded) is indicated by a predefined definition (e.g., use front-loaded DMRS in UE specific search space (USS) set, use full-loaded DMRS in common search space (CSS) set) or by a network (such as higher layer signaling and/or DCI).

In this case, when multiple terminals monitor the same CORESET, in order to prevent performance degradation due to different DMRS types, the DMRS types may be set differently for each CORESET. This may be implemented in such a way that the network indicates the DMRS type that should be assumed when monitoring the corresponding CORESET by adding a parameter indicating the DMRS mapping type in the CORESET setting. Additionally, the number of symbols in which the DMRS is transmitted and the position of the symbols in which the DMRS is transmitted may be indicated by a predefined or an indication of the network (using higher layer signaling, etc.). As an example, when the 5-symbol CORESET proposed below is introduced, the network transmits DMRS in 2 symbol(s) in the corresponding CORESET, specifically, the UE may be informed that DMRS is transmitted in the 1st and 3rd symbols. In this case, a symbol index through which the DMRS is transmitted may be predefined for each number of symbols through which the DMRS is transmitted, or may be indicated by the network.

For example, the CORESET setting according to the present disclosure may be configured as follows. (The DMRS type below may include the number of symbols to which the DMRS is transmitted and the symbol index to which the DMRS is mapped. Alternatively, the number of symbols to which the DMRS is transmitted and the symbol index to which the DMRS is mapped may be indicated by another parameter.)

The contents described above may be described in terms of 'ControlResourceSet' IE as follows.

The IE ControlResourceSet may be used to configure a time and/or frequency CORESET to retrieve downlink control information, and an example thereof may be as shown in the table below.

TABLE 4

```
-- ASN1START
-- TAG-CONTROLRESOURCESET-START
ControlResourceSet ::=        SEQUENCE {
   controlResourceSetId          ControlResourceSetId,
   frequencyDomainResources      BIT STRING (SIZE (45)),
   duration                      INTEGER (1..maxCoReSetDuration),
   DMRS type
   ...
}
-- TAG-CONTROLRESOURCESET-STOP
-- ASN1STOP
```

DMRS type: It can indicate the type of DMRS. For example, the DMRS type may indicate front-loaded or full-loaded.

As another method, the DMRS type that should be assumed in the CORESET monitored by the corresponding BWP can be defined in the BWP setting. For example, similar to the above example, a parameter indicating the DMRS type may be added to the existing BWP configuration.

The example described here does not describe only an example for a case in which the terminal is a REDCAP terminal. That is, in the case of the embodiment of the present specification, not only the configuration for the REDCAP terminal is applied, but the previous (and described later) embodiments may also be applied to the configuration for the terminal other than the REDCAP terminal.

In addition, although described above, the above-described embodiments may also be applied to examples to be described later.

II. Example #2: Extension of CORESET Duration

As described earlier, within the CORESET setting, the parameter "duration" indicating the size of the CORESET in the time domain is included, the current duration is defined so that one of 1, 2, and 3-symbol(s) is configured. In this specification, it is proposed to define a duration greater than 3 in order to increase the resource amount of CORESET. For example, it can be defined as above-mentioned 'maxCoReSetDuration'=N (N is a natural number equal to or greater than 4). For this, all or part of the methods below may be used, and CORESET duration extension may be implemented through a combination of methods within each method described below.

In summary, this specification provides a configuration that increases the CORESET interval (so that it can have more than 4 symbols or more (maximum 6) symbols) compared to the CORESET which has only 3 symbols in the prior art, to solve the resource shortage.

As described above, the examples described herein are not only examples of the case where the terminal is a REDCAP terminal. That is, in the case of the embodiment of the present specification, not only the configuration for the REDCAP terminal is applied, but the previous (and described later) embodiments may also be applied to the configuration for the terminal other than the REDCAP terminal.

<Method #1: Extension of CORESET Duration>

By extending the CORESET duration that can be currently set to 1,2,3-symbols to 4,5,6-symbols, the amount of CORESET resources can be increased. However, in this case, it may be necessary to readjust the REG bundle size. The REG bundle size in the current CORESET setting can be set to 2 or 6 when the duration of CORESET is 1, 2 or 6 when the duration is 2, and 3 or 6 when the duration is 3, this may mean that REGs belonging to one RB are included in the same bundle in all cases.

Therefore, in order to support 4,5,6-symbol CORESET, an additional REG bundling method should be considered, and the following options may be considered. The options below may be implemented alone or in combination, or may be implemented by a combination of technologies included in each option.

Hereinafter, embodiments of the present specification will be described with reference to the drawings. The following drawings were created to explain a specific example of the present specification. Since the names of specific devices described in the drawings or the names of specific signals/messages/fields are presented by way of example, the technical features of the present specification are not limited to the specific names used in the following drawings.

Figure 12:
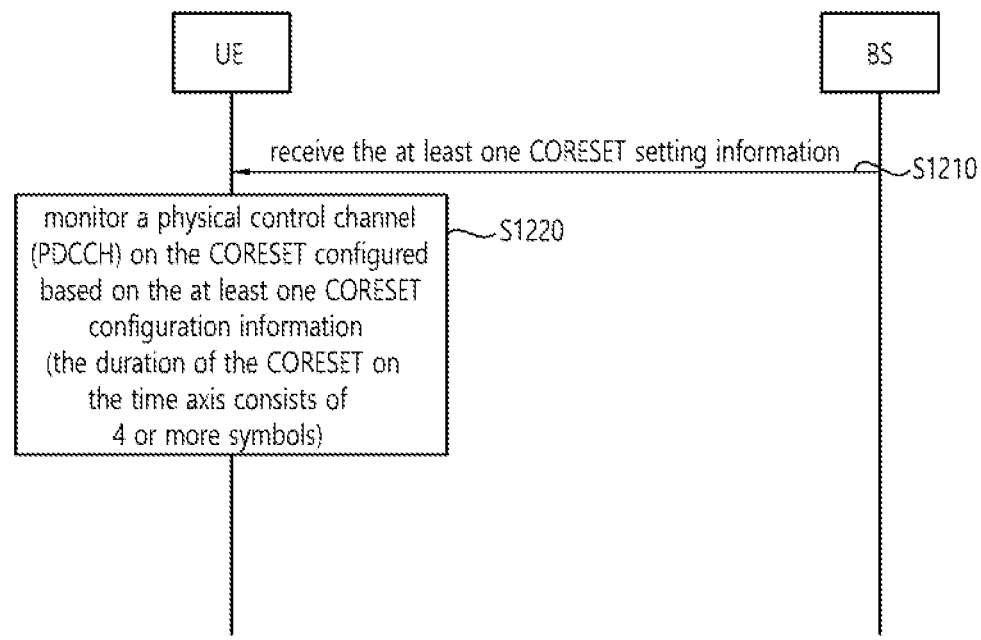
FIG. 12 is a flowchart of a method for receiving at least one COntrol REsource SET (CORESET) configuration information according to an embodiment of the present specification.

FIG. 12 is a flowchart of a method for receiving at least one COntrol REsource SET (CORESET) configuration information according to an embodiment of the present specification.

According to FIG. 12, the terminal may receive the at least one CORESET setting information from the base station (S1210). Here, the CORESET setting information may include an example of the CORESET setting information (e.g. 'ControlResourceSet') described above (and/or to be described later).

As an example specifically applied to Example #2 of Example #1 described above, for example, the at least one CORESET configuration information may include information indicating whether a demodulation reference signal (DMRS) for the UE is allocated to a plurality of symbols or only to a single symbol.

In addition, the terminal here is not applied only to the configuration for the REDCAP terminal as described above, and the above (and to be described later) embodiments may also be applied to the configuration for the terminal other than the REDCAP terminal (Of course, it can also be applied to the configuration for the REDCAP terminal).

Since more specific examples of the present content are the same as those described above and/or will be described later, repeated descriptions of overlapping content will be omitted.

A physical control channel (PDCCH) may be monitored on the CORESET configured based on the at least one CORESET configuration information (S1220). Here, the duration of the CORESET on the time axis is characterized in that it consists of 4 or more symbols. Since more specific examples of the present content are the same as those described above and/or will be described later, repeated descriptions of overlapping content will be omitted.

Hereinafter, embodiments of the present specification will be described in more detail.

Option 1) CORESET with 4, 5, 6 Symbol(s)

As a specific example of the above-described example, the at least one CORESET setting information is single CORESET setting information, and the single CORESET setting information may inform that the duration of the CORESET consists of 1 to 6 symbols. Since more specific examples of the present content are the same as those described above and/or will be described later, repeated descriptions of overlapping content will be omitted.

Here, for example, a plurality of Control Channel Elements (CCEs) are mapped to the CORESET, the number of resource element groups (REGs) included in each of the plurality of CCEs may be set based on the number of symbols constituting the duration. Since more specific examples of the present content are the same as those described above and/or will be described later, repeated descriptions of overlapping content will be omitted.

Hereinafter, the above examples will be described in more detail.

In the current spec. in which 1 CCE is composed of 6 REGs, when a 4,5-symbol CORESET is configured, resources belonging to multiple CCEs may coexist in the same RB. In this case, it is difficult to apply the aforementioned front-loaded DMRS, etc., and when applied, problems such as a difference in channel estimation performance between REGs belonging to one CCE may occur.

Accordingly, the extension of the CORESET duration may define only the extension to the 6-symbol CORESET so that resources belonging to different CCEs do not coexist in one RB. In this case, even if the CORESET duration is extended, there is an advantage that there is no need to consider additional options for REG bundle size (At this time, the REG bundle size may be selected by the network among all or part of 1,2,3,6.) or interleaving related parameters (Or the REG bundle size may be fixed to 6).

Alternatively, the number of REGs per CCE may be defined differently for each extended duration to support various durations. For example, in the case of a 4-symbol CORESET, the number of REGs per one CCE is defined as 4 or 8, etc. The REG bundle size can also be set to 4 or 8, etc. In the case of 5-symbol CORESET, the number of REGs per one CCE is defined as 5 or 10, etc. The REG bundle size can also be set to 5 or 10, etc. In this case, other CORESET settings other than the duration and REG bundle size may be set the same as before.

Option 2) Duration Extension with CORESET Decomposition

As a specific example of the example described above, for example, the CORESET includes a first sub CORESET and a second sub CORESET, the duration of the first sub-CORESET consists of 1 to 3 symbols, the duration of the second sub-CORESET consists of 1 to 3 symbols, a sum of the duration of the first sub-CORESET and the duration of the second sub-CORESET may be the same as the duration of the CORESET. Since more specific examples of the present content are the same as those described above and/or will be described later, repeated descriptions of overlapping content will be omitted.

Meanwhile, although it has been described herein that CORESET can be composed of a first sub-CORESET and a second CORESET, this is merely an example for expressing that a CORESET can be composed of a plurality of sub-CORESETs. That is, depending on the case, the CORESET may not consist of only two sub-CORESETs, but may be composed of N (N is a natural number) sub-CORESETs. Here, how many sub-CORESETs the CORESET will consist of may be defined in advance by the specification or may be preset in the terminal (and/or the base station). In addition to this, the base station may indicate (and/or set) to the terminal how many sub-CORESETs the CORESET will consist of.

Here, for example, the at least one CORESET setting information includes first CORESET setting information and second CORESET setting information, the first sub-CORESET is configured based on the first CORESET setting information, the second sub-CORESET may be configured based on the second CORESET setting information. Since more specific examples of the present content are the same as those described above and/or will be described later, repeated descriptions of overlapping content will be omitted.

Here, for example, a plurality of Control Channel Elements (CCEs) are mapped to the CORESET, indexing is performed on each of the plurality of CCEs in the CORESET, each CCE included in the plurality of CCEs consists of six REGs (Resource Element Groups), the REG may consist of one resource block on the frequency axis and one symbol on the time axis. Since more specific examples of the present content are the same as those described above and/or will be described later, repeated descriptions of overlapping content will be omitted.

Here, for example, in the time axis, the first sub-CORESET precedes the second sub-CORESET, indexing for each of the plurality of CCEs is first performed on CCEs included in the first sub-CORESET, thereafter, it may be performed on CCEs included in the second sub-CORESET. Since more specific examples of the present content are the same as those described above and/or will be described later, repeated descriptions of overlapping content will be omitted.

Here, for example, the indexing of each of the plurality of CCEs may be performed on the plurality of CCEs while alternating the first sub-CORESET and the second sub-CORESET. Since more specific examples of the present content are the same as those described above and/or will be described later, repeated descriptions of overlapping content will be omitted.

Here, for example, when the number of CCEs for the first sub-CORESET is different from the number of CCEs for the second sub-CORESET, based on the ratio between the number of CCEs for the first sub-CORESET and the CCEs for the second sub-CORESET, indexing of each of the plurality of CCEs may be performed on the first sub-CORESET and the second CORESET. Since more specific examples of the present content are the same as those described above and/or will be described later, repeated descriptions of overlapping content will be omitted.

Hereinafter, the above examples will be described in more detail.

If the extension of the CORESET duration is implemented through a combination of existing settings, the complexity of UE implementation may not increase significantly. To this end, in the present specification, it is proposed to decompose each CORESET in the time domain to configure a sub-CORESET. In this case, the duration of each sub-CORESET may be defined as an existing duration (i.e., 1,2,3-symbol), the REG bundle size of each sub-CORESET may be defined by an existing method in association with the duration of each sub-CORESET.

For example, for CORESET duration "4", it can be decomposed into multiple sub-CORESETs in the same way as {sub-CORESET #A with 1 symbol duration, sub-CORESET #B with 3 symbol duration} or {sub-CORESET #A with 2 symbol duration, sub-CORESET #B with 2 symbol duration} or {sub-CORESET #A with 3 symbol duration, sub-CORESET #B with 1 symbol duration}. In this case, the CORESET setting such as the REG bundle size of each sub-CORESET may be defined in advance or indicated by the network. That is, when the network sets a CORESET of an extended duration compared to the existing duration, the network may instruct the sub-CORESETs of the corresponding CORESET and the CORESET setting for each sub-CORESET. Alternatively, a sub-CORESET setting for each extended duration may be defined in advance. When this specification is applied, the following CORESET decomposition is possible.

Here, for example, sub-CORESET #A in this example may be related to the first sub-CORESET described above, sub-CORESET #B may be related to the second sub-CORESET.

Example 4 symbols CORESET->2 symbols subCORESET+2 symbols subCORESET, 1 (or 3) symbol subCORESET+3 (or 1) symbol subCORESET 5 symbol CORESET->2 (or 3) symbol subCORESET+3 (or 2) symbol subCORESET 6 symbols CORESET->3 symbols subCORESET+3 symbols subCORESET Or 6 symbol CORESET (with new size of duration=6)

In addition, as the number of total CCEs among parameters of a hashing function that serves to indicate CCEs belonging to each candidate, the sum of the number of CCEs belonging to each sub-CORESET (i.e., the number of CCEs in the entire CORESET) may be applied.

Additionally, a CCE indexing method in a CORESET composed of a plurality of sub-CORESETs may be determined as follows.

Option 2-1) Sequential CCE Mapping by Sub-CORESET

CCE is formed by applying the existing CCE-to-REG mapping method to each sub-CORESET, CCE indexing in the entire CORESET can be performed in units of sub-CORESETs. For example, when decomposition of 5-symbol CORESET into 2-symbol sub-CORESET and 3-symbol sub-CORESET, CCE indexing in the entire CORESET maps all the CCEs of the sub-CORESET in the previous position in the time domain, this may be performed in a manner of mapping the CCE of the next sub-CORESET.

Figure 13:
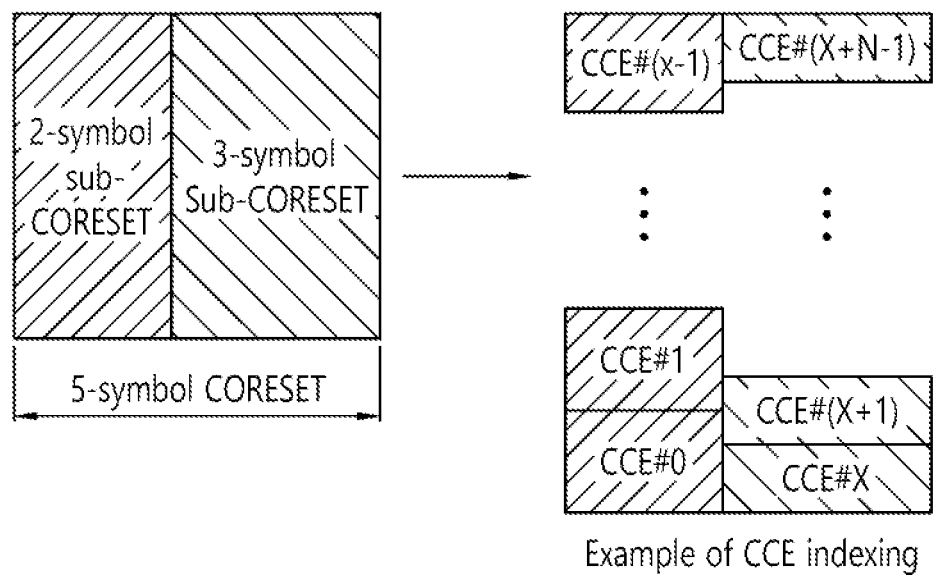
FIG. 13 shows an example of CCE indexing when decomposition of 5-symbol CORESET into 2-symbol sub-CORESET and 3-symbol sub-CORESET.

FIG. 13 shows an example of CCE indexing when decomposition of 5-symbol CORESET into 2-symbol sub-CORESET and 3-symbol sub-CORESET. Although the figure illustrates CCE indexing in the localized mapping method, it can be equally applied to distributed mapping (ie, when interleaving between REG bundles is used).

Option 2-2) Round Robin Among Sub-CORESETs

In order to ensure that CCEs belonging to one candidate are evenly distributed in the time domain, CCE indexing may be alternately performed for each sub-CORESET. At this time, if different durations are set for each subCORESET, CCE indexing may be alternately performed for each subCORESET, or indexing may be performed on each subCORESET according to the amount of resources constituting one CCE in the frequency domain.

In the former case, CCEs with a high index may be clustered in a subCORESET having a larger number of CCEs, and in the latter case, all CCEs may be evenly arranged in different subCORESETs.

Figure 14:
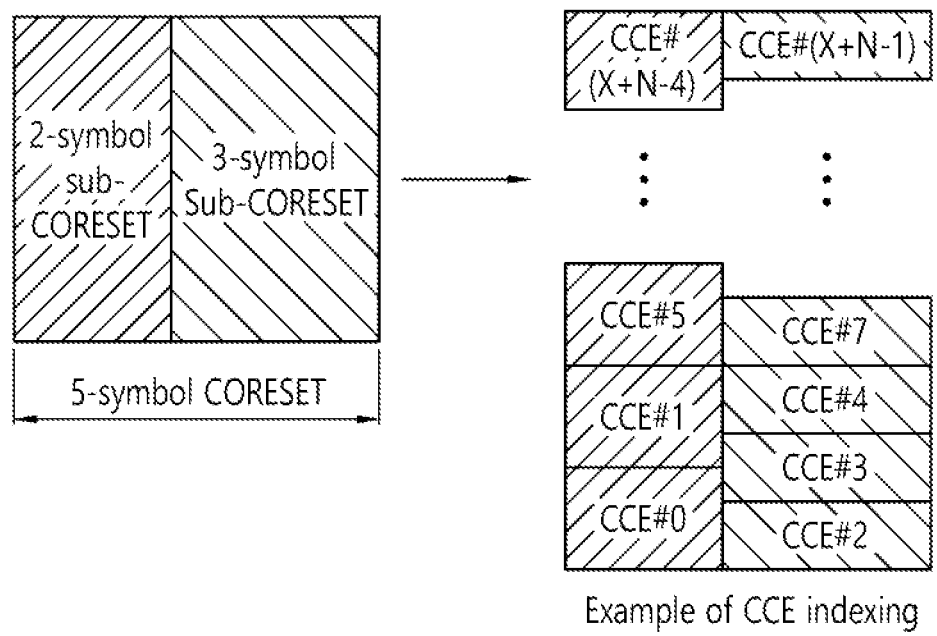
FIG. 14 shows an embodiment in which option 2-2 is applied in the same situation as FIG. 13.

FIG. 14 shows an embodiment in which option 2-2 is applied in the same situation as FIG. 13.

In FIG. 14, a 2-symbol CORESET consists of a smaller number of CCEs than a 3-symbol CORESET, and the figure shows an example of a method of indexing CCEs according to the ratio of the number of CCEs in each subCORESET.

That is, since the number of CCEs of the 3-symbol sub-CORESET is 1.5 times larger than that of the 2-symbol subCORESET, CCE indexing is performed consecutively on two consecutive CCEs of the 2-symbol subCORESET, CCE indexing may be performed in such a way that the following three CCE indexes are assigned to a three-symbol subCORESET. The figure shows an example of localized mapping (that is, when interleaving is not used), the figure may be interpreted as a CCE indexing method in a logical domain. The method of the drawing is described as an array of indexes as follows. (The description below is applicable regardless of whether interleaving is applied or not)

1. UE performs CCE indexing for each subCORESET
   A. For example, if 5-symbol CORESET consists of 2-symbol subCORESET and 3-symbol subCORESET, CCE indexing (e.g., #0~#(X−1)) may be performed in the conventional way in 2 symbol subCORESET, In the 3-symbol subCORESET, CCE indexing (e.g., #0 to #(N−1)) may be performed in the same manner.
2. UE performs CCE indexing of that CORESET based on the above subCORESETs
   A. When the frequency domain resource amount is the same, since the number of CCEs of the 2-symbol subCORESET corresponds to ⅔ of the number of CCEs of the 3-symbol subCORESET, after CCE indexing for 2 CCEs of 2-symbol subCORESET, indexing of 3 symbol subCORESET CCEs is performed
3. After that, the hashing function for blind decoding is performed based on the total number of CCEs (e.g., X+N CCEs), and CCEs included in each candidate are determined based on the CCE index of CORESET.

<Method #2: CORESET Combining>

As another method for increasing the amount of CORESET resources, different CORESETs may be combined. This can be implemented as a method of setting to indicate multiple CORESET IDs in one search space set, it may also be possible to repeatedly indicate the same CORESET. As described above, each parameter in the search space set setting for performing CORESET combining can be set as follows.

1. CORESET ID
   A. In order to link multiple CORESETs in one SS set, multiple CORESET IDs may be set. In addition, a method of setting the same CORESET multiple times is also possible.
   B. UE may assume that multiple CORESETs indicated in one SS set configuration constitute one combined CORESET.
2. Monitoring Period
   A. It can be assumed that one monitoring cycle is equally applied to multiple CORESETs.
3. CORESET Starting Symbol in the Slot
   A. The network may indicate different starting symbols in the same or different slots for each CORESET.
   B. When only one starting symbol is configured, the UE may deploy a plurality of CORESETs from the corresponding starting symbol according to a rule set by a predefined or network instruction.
      i. For example, when only one starting symbol position in a slot within a specific SS set setting is configured, and there are multiple CORESETs associated with the corresponding SS set, it can be assumed that the UE is located in ascending order (so as not to overlap) starting with the corresponding starting symbol, starting with the CORESET of the low ID. In this case, the location in the frequency domain may be determined by frequency domain resource allocation information in each CORESET setting.
      ii. Similar to the above, the location of the CORESET may be determined based on the CORESET setting order in the SS set setting. That is, the CORESET setting order in the SS set setting may be interpreted as the CORESET mapping order in the time domain.
4. AL and Number of Candidates
   A. It can be assumed that the aggregation level and the number of candidates to be monitored in the corresponding SS set are applied to the entire combined CORESET. That is, the UE may determine the CCE belonging to each candidate by performing a hashing function based on the total number of CCEs of the combined CORESET.
   B. CCE indexing of CORESET combined with CCE of each CORESET can be performed by the method suggested in options 2-1 and 2-2 above.
5. SS Type and Monitored DCI Format
   A. The SS type (CSS or USS) of the corresponding SS set and the DCI format to be monitored can also be applied based on the combined CORESET.

Method #1/#2 above proposed a method to increase the resource amount of CORESET by linking multiple CORESETs or subCORESETs. In this process, if the settings between CORESETs are significantly different, it may lead to disadvantages such as an increase in UE complexity or a decrease in gain due to an increase in CORESET resources.

For example, when CORESETs with different precoder granularity are combined, the UE performs MMSE-based channel estimation in a specific CORESET, in another CORESET immediately following, it may be necessary to perform DFT-based channel estimation. This may act as a cause of increasing the HW/SW complexity of the UE.

As another example, when different TCIs are configured for each CORESET to be combined, the UE may increase HW/SW complexity to form a receiving beam according to different TCIs.

In order to solve such a problem, in the present specification, it is proposed to set all or some of the parameters in a plurality of CORESETs (or subCORESETs) associated with one search space set to be identical. The parameter list set to be the same may be indicated by predefined definition or through higher layer signaling of a network, or the like. It can be assumed that parameters other than the same set parameters follow each CORESET (or subCORESET) setting.

For example, frequency domain resource allocation of CORESETs associated with a specific SS set may be predefined or indicated by the network according to RA information of CORESETs having a low CORESET index (or located at an earlier point in time). In this case, it may be assumed that parameters other than the frequency domain RA follow the corresponding CORESET setting. Another example, it may be assumed that spatial QCL information for a plurality of CORESETs associated with one SS set follows spatial QCL information of a specific CORESET (e.g., lowest indexed CORESET or CORESET specified by the network).

If the above-described examples are described in another form, they may be as follows.

Figure 15:
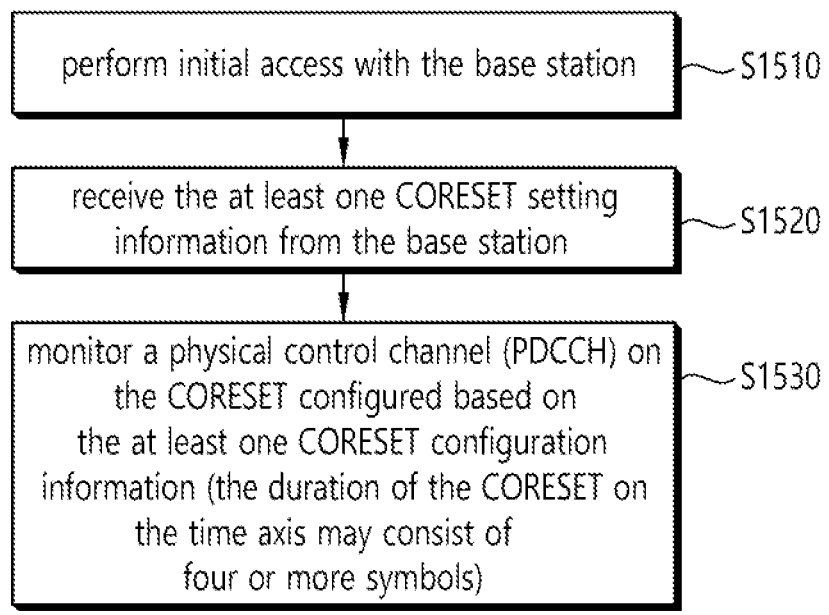
FIG. 15 is a flowchart of a method for receiving at least one COntrol REsource SET (CORESET) configuration information according to another embodiment of the present specification.

FIG. 15 is a flowchart of a method for receiving at least one COntrol REsource SET (CORESET) configuration information according to another embodiment of the present specification.

According to FIG. 15, the terminal may perform initial access with the base station (51510). Since more specific examples of the present content are the same as those described above and/or will be described later, repeated descriptions of overlapping content will be omitted.

The terminal may receive the at least one CORESET setting information from the base station (S1520). Since more specific examples of the present content are the same as those described above and/or will be described later, repeated descriptions of overlapping content will be omitted.

The UE may monitor a physical control channel (PDCCH) on the CORESET configured based on the at least one CORESET configuration information (S1530). Here, the duration of the CORESET on the time axis may consist of four or more symbols. Since more specific examples of the present content are the same as those described above and/or will be described later, repeated descriptions of overlapping content will be omitted.

Effects that can be obtained through specific examples of the present specification are not limited to the same or the effects listed above. For example, various technical effects that a person having ordinary skill in the related art can understand or derive from this specification may exist. Accordingly, the specific effects of the present specification are not limited to those explicitly described herein, and may include various effects that can be understood or derived from the technical characteristics of the present specification.

On the other hand, if the contents of the above-described embodiments will be described from the viewpoint of the subject of various operations, it may be as follows.

The following drawings were created to explain a specific example of the present specification. Since the names of specific devices described in the drawings or the names of specific signals/messages/fields are presented by way of example, the technical features of the present specification are not limited to the specific names used in the following drawings.

Figure 16:
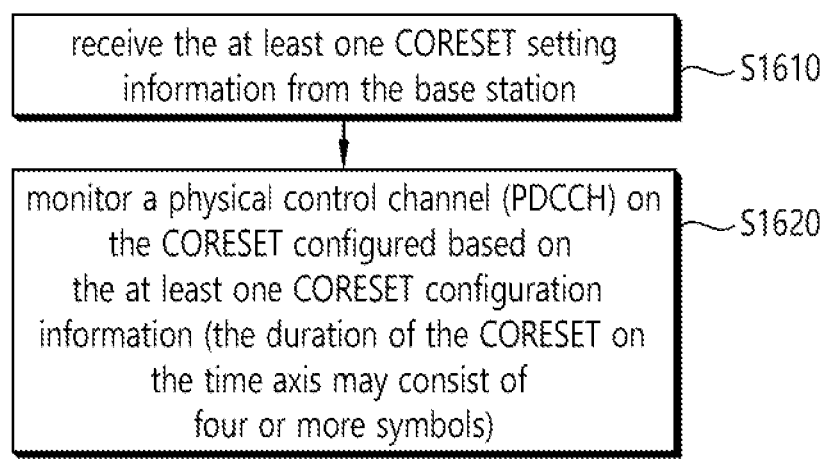
FIG. 16 is a flowchart of a method of receiving at least one COntrol REsource SET (CORESET) configuration information from the viewpoint of a terminal, according to an embodiment of the present specification.

FIG. 16 is a flowchart of a method of receiving at least one COntrol REsource SET (CORESET) configuration information from the viewpoint of a terminal, according to an embodiment of the present specification.

According to FIG. 16, the terminal may receive the at least one CORESET setting information from the base station (S1610). Since more specific examples of the present content are the same as those described above and/or will be described later, repeated descriptions of overlapping content will be omitted.

The UE may monitor a physical control channel (PDCCH) on the CORESET configured based on the at least one CORESET configuration information (S1620). Here, the duration of the CORESET on the time axis may consist of 4 or more symbols. Since more specific examples of the present content are the same as those described above and/or will be described later, repeated descriptions of overlapping content will be omitted.

Figure 17:
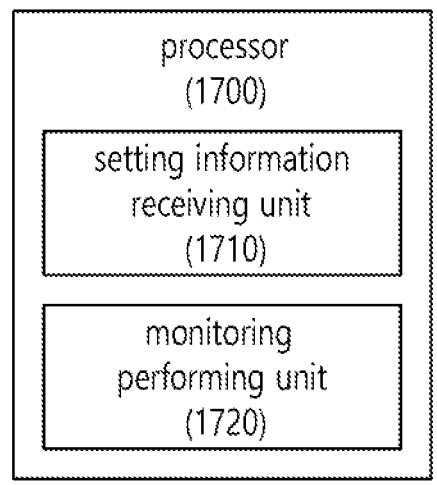
FIG. 17 is a block diagram of an example of an apparatus for receiving at least one COntrol REsource SET (CORESET) configuration information from the viewpoint of a terminal, according to an embodiment of the present specification.

FIG. 17 is a block diagram of an example of an apparatus for receiving at least one COntrol REsource SET (CORESET) configuration information from the viewpoint of a terminal, according to an embodiment of the present specification.

Referring to FIG. 17, the processor 1700 may include a setting information receiving unit 1710 and a monitoring performing unit 1720. Here, the processor 1700 may correspond to a processor to be described later (or described above).

The setting information receiving unit 1710 may be configured to control the transceiver to receive at least one CORESET (COntrol REsource SET) setting information from the base station.

The monitoring performing unit 1720 may be configured to monitor a physical control channel (PDCCH) on a CORESET configured based on the at least one piece of CORESET configuration information.

Here, the duration of the CORESET on the time axis may consist of 4 or more symbols.

Although not shown separately, the present specification may also provide the following embodiments.

According to one example, a user equipment (UE) may comprise a transceiver, at least one memory and at least one processor operatively coupled with the at least one memory and the transceiver, wherein the at least one processor is configured to perform an initial access with a base station, control the transceiver to receive, from the base station, at least one control resource set (CORESET) configuration information and monitor a physical control channel (PDCCH) on a CORESET configured based on the at least one CORESET configuration information, wherein a duration of the CORESET on a time axis consists of 4 or more symbols. Since more specific examples of the present content are the same as those described above and/or will be described later, repeated descriptions of overlapping content will be omitted.

According to another example, an apparatus may comprise at least one memory and at least one processor operatively coupled with the at least one memory, wherein the at least one processor is configured to perform an initial access with a base station, control the transceiver to receive, from the base station, at least one control resource set (CORESET) configuration information and monitor a physical control channel (PDCCH) on a CORESET configured based on the at least one CORESET configuration information, wherein a duration of the CORESET on a time axis consists of 4 or more symbols. Since more specific examples of the present content are the same as those described above and/or will be described later, repeated descriptions of overlapping content will be omitted.

According to still another example, at least one computer readable medium includes instructions based on being executed by at least one processor, wherein the at least one processor is configured to perform an initial access with a base station, control the transceiver to receive, from the base station, at least one control resource set (CORESET) configuration information and monitor a physical control channel (PDCCH) on a CORESET configured based on the at least one CORESET configuration information, wherein a duration of the CORESET on a time axis consists of 4 or more symbols. Since more specific examples of the present content are the same as those described above and/or will be described later, repeated descriptions of overlapping content will be omitted.

FIG. 18 is a flowchart of a method of transmitting at least one COntrol REsource SET (CORESET) configuration information from the viewpoint of a base station, according to an embodiment of the present specification.

Referring to FIG. 18, the base station may transmit the at least one CORESET setting information to the terminal (S1810). Here, a physical control channel (PDCCH) is transmitted on a CORESET configured based on the at least one CORESET configuration information, and the duration of the CORESET on the time axis may be composed of four or more symbols. Since more specific examples of the present content are the same as those described above and/or will be described later, repeated descriptions of overlapping content will be omitted.

Figure 19:
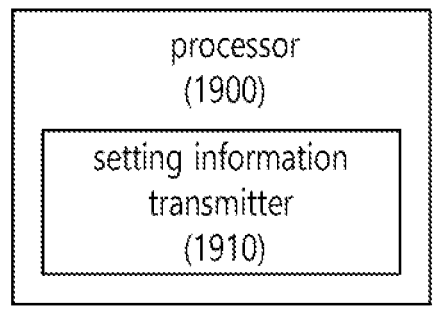
FIG. 19 is a block diagram of an example of an apparatus for transmitting at least one COntrol REsource SET (CORESET) configuration information from the viewpoint of a base station, according to an embodiment of the present specification.

FIG. 19 is a block diagram of an example of an apparatus for transmitting at least one COntrol REsource SET (CORESET) configuration information from the viewpoint of a base station, according to an embodiment of the present specification.

Referring to FIG. 19, the processor 1900 may include a setting information transmitter 1910. Here, the processor 1900 may correspond to a processor to be described later (or described above).

The configuration information transmitter 1910 may be configured to control the transceiver to transmit at least one piece of CORESET configuration information to the terminal. Here, a physical control channel (PDCCH) is transmitted on a CORESET configured based on the at least one CORESET configuration information, and the duration of the CORESET on the time axis may be composed of four or more symbols. Since more specific examples of the present content are the same as those described above and/or will be described later, repeated descriptions of overlapping content will be omitted.

Figure 20:
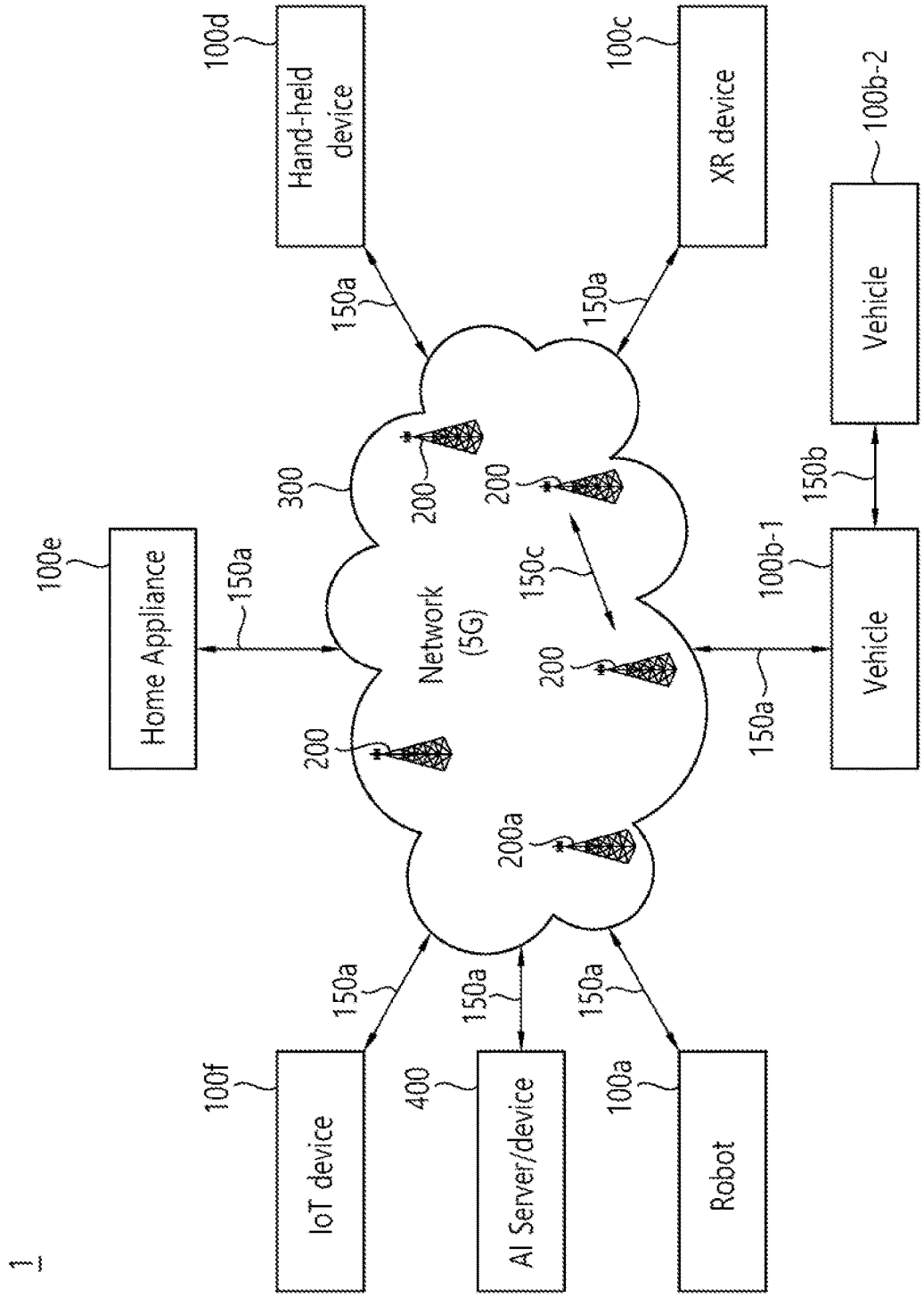
FIG. 20 shows an exemplary communication system (1), according to an embodiment of the present specification.

FIG. 20 shows an exemplary communication system (1), according to an embodiment of the present specification.

Referring to FIG. 20, a communication system (1) to which various embodiments of the present specification are applied includes wireless devices, Base Stations (BSs), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot (100*a*), vehicles (100*b*-1, 100*b*-2), an eXtended Reality (XR) device (100*c*), a hand-held device (100*d*), a home appliance (100*e*), an Internet of Things (IoT) device (100*f*), and an Artificial Intelligence (AI) device/server (400). For example, the vehicles may include a vehicle having a wireless communication function, an autonomous vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, and so on. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device (200*a*) may operate as a BS/network node with respect to other wireless devices.

Here, the wireless communication technology implemented in the wireless device of the present specification may include a narrowband Internet of Things for low-power communication as well as LTE, NR, and 6G. At this time, for example, NB-IoT technology may be an example of LPWAN (Low Power Wide Area Network) technology, and may be implemented in standards such as LTE Cat NB1 and/or LTE Cat NB2, and is limited to the above-mentioned names. not. Additionally or alternatively, the wireless communication technology implemented in the wireless device of the present specification may perform communication based on LTE-M technology. In this case, as an example, the LTE-M technology may be an example of an LPWAN technology, and may be called by various names such as enhanced machine type communication (eMTC). For example, LTE-M technology is 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) may be implemented in at least one of various standards such as LTE M, and is not limited to the above-described name. Additionally or alternatively, the wireless communication technology implemented in the wireless device of the present specification may include at least one of ZigBee, Bluetooth, and Low Power Wide Area Network (LPWAN) considering low power communication. and is not limited to the above-mentioned names. For example, the ZigBee technology can create PAN (personal area networks) related to small/low-power digital communication based on various standards such as IEEE 802.15.4, and can be called by various names.

The wireless devices (100*a*-100*f*) may be connected to the network (300) via the BSs (200). An Artificial Intelligence (AI) technology may be applied to the wireless devices (100*a*-100*f*) and the wireless devices (100*a*-100*f*) may be connected to the AI server (400) via the network (300). The network (300) may be configured using a 3G network, a 4G (e.g., LTE) network, or a 5G (e.g., NR) network. Although the wireless devices (100*a*-100*f*) may communicate with each other through the BSs (200)/network (300), the wireless devices (100*a*-100*f*) may perform direct communication (e.g., sidelink communication) with each other without passing through the BSs/network. For example, the vehicles (100*b*-1, 100*b*-2) may perform direct communication (e.g., Vehicle-to-Vehicle (V2V)/Vehicle-to-everything (V2X) communication). The IoT device (e.g., a sensor) may perform direct communication with other IoT devices (e.g., sensors) or other wireless devices (100*a*~100*f*).

Wireless communication/connections (150*a*, 150*b*, 150*c*) may be established between the wireless devices (100*a*-100*f*)/BS (200), or BS (200)/BS (200). Herein, the wireless communication/connections may be established through various RATs (e.g., 5G NR) such as uplink/downlink communication (150*a*), sidelink communication (150*b*) (or D2D communication), or inter BS communication (150*c*) (e.g., relay, Integrated Access Backhaul (IAB)). The wireless devices and the BSs/the wireless devices may transmit/receive radio signals to/from each other through the wireless communication/connections (150*a*, 150*b*, 150*c*). For example, the wireless communication/connections (150*a*, 150*b*, 150*c*) may transmit/receive signals through various physical channels. For this, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present specification.

Meanwhile, in NR, multiple numerologies (or subcarrier spacing (SCS)) for supporting various 5G services may be supported. For example, in case an SCS is 15 kHz, a wide area of the conventional cellular bands may be supported, and, in case an SCS is 30 kHz/60 kHz dense-urban, lower latency, and wider carrier bandwidth may be supported. In case the SCS is 60 kHz or higher, a bandwidth that is greater than 24.25 GHz may be used in order to overcome phase noise.

An NR frequency band may be defined as two different types of frequency ranges (FR1, FR2). The values of the frequency ranges may be changed (or varied), and, for example, the two different types of frequency ranges (FR1, FR2) may be as shown below in Table 5. Among the frequency ranges that are used in an NR system, FR1 may mean a "sub 6 GHz range", and FR2 may mean an "above 6 GHz range" and may also be referred to as a millimeter wave (mmW).

TABLE 5

| Frequency Range designation | Corresponding frequency range | Subcarrier Spacing |
| --- | --- | --- |
| FR1 | 450 MHz-6000 MHz | 15, 30, 60 kHz |
| FR2 | 24250 MHz-52600 MHz | 60, 120, 240 kHz |

As described above, the values of the frequency ranges in the NR system may be changed (or varied). For example, as shown below in Table 6, FR1 may include a band within a range of 410 MHz to 7125 MHz. More specifically, FR1 may include a frequency band of 6 GHz (or 5850, 5900, 5925 MHz, and so on) and higher. For example, a frequency band of 6 GHz (or 5850, 5900, 5925 MHz, and so on) and higher being included in FR1 may include an unlicensed band. The unlicensed band may be used for various purposes, e.g., the unlicensed band for vehicle-specific communication (e.g., automated driving).

TABLE 6

| Frequency Range designation | Corresponding frequency range | Subcarrier Spacing |
| --- | --- | --- |
| FR1 | 410 MHz-7125 MHz | 15, 30, 60 kHz |
| FR2 | 24250 MHz-52600 MHz | 60, 120, 240 kHz |

Figure 21:
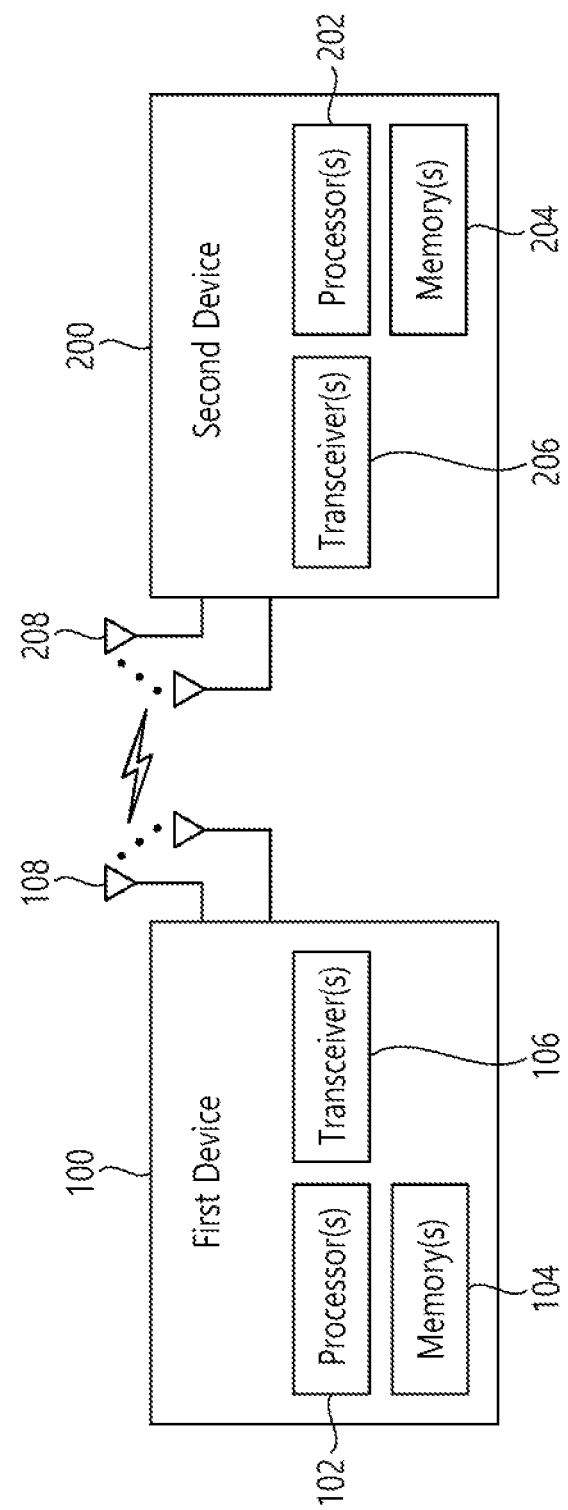
FIG. 21 shows an exemplary wireless device to which the present specification can be applied.

Hereinafter, an example of wireless devices to which the present specification is applied will be described in detail. FIG. 21 shows an exemplary wireless device to which the present specification can be applied. Referring to FIG. 21, a first wireless device (100) and a second wireless device (200) may transmit radio signals through a variety of RATs (e.g., LTE, NR). Herein, {the first wireless device (100) and the second wireless device (200)} may correspond to {the wireless device (100x) and the BS (200)} and/or {the wireless device (100x) and the wireless device (100x)} of FIG. 20.

The first wireless device (100) may include one or more processors (102) and one or more memories (104) and additionally further include one or more transceivers (106) and/or one or more antennas (108). The processor(s) (102) may control the memory(s) (104) and/or the transceiver(s) (106) and may be configured to implement the descriptions, functions, procedures, proposals, methods, and/or operational flowcharts disclosed in this document. For example, the processor(s) (102) may process information within the memory(s) (104) to generate first information/signals and then transmit radio signals including the first information/signals through the transceiver(s) (106). The processor(s) (102) may receive radio signals including second information/signals through the transceiver (106) and then store information obtained by processing the second information/signals in the memory(s) (104). The memory(s) (104) may be connected to the processor(s) (102) and may store various information related to operations of the processor(s) (102). For example, the memory(s) (104) may store software code including instructions for performing a part or the entirety of processes controlled by the processor(s) (102) or for performing the descriptions, functions, procedures, proposals, methods, and/or operational flowcharts disclosed in this document. Herein, the processor(s) (102) and the memory(s) (104) may be a part of a communication modem/circuit/chip designed to implement RAT (e.g., LTE or NR). The transceiver(s) (106) may be connected to the processor(s) (102) and transmit and/or receive radio signals through one or more antennas (108). Each of the transceiver(s) (106) may include a transmitter and/or a receiver. The transceiver(s) (106) may be interchangeably used with Radio Frequency (RF) unit(s). In the present specification, the wireless device may represent a communication modem/circuit/chip.

The second wireless device (200) may include one or more processors (202) and one or more memories (204) and additionally further include one or more transceivers (206) and/or one or more antennas (208). The processor(s) (202) may control the memory(s) (204) and/or the transceiver(s) (206) and may be configured to implement the descriptions, functions, procedures, proposals, methods, and/or operational flowcharts disclosed in this document. For example, the processor(s) (202) may process information within the memory(s) (204) to generate third information/signals and then transmit radio signals including the third information/signals through the transceiver(s) (206). The processor(s) (202) may receive radio signals including fourth information/signals through the transceiver(s) (206) and then store information obtained by processing the fourth information/signals in the memory(s) (204). The memory(s) (204) may be connected to the processor(s) (202) and may store various information related to operations of the processor(s) (202). For example, the memory(s) (204) may store software code including instructions for performing a part or the entirety of processes controlled by the processor(s) (202) or for performing the descriptions, functions, procedures, proposals, methods, and/or operational flowcharts disclosed in this document. Herein, the processor(s) (202) and the memory(s) (204) may be a part of a communication modem/circuit/chip designed to implement RAT (e.g., LTE or NR). The transceiver(s) (206) may be connected to the processor(s) (202) and transmit and/or receive radio signals through one or more antennas (208). Each of the transceiver(s) (206) may include a transmitter and/or a receiver. The transceiver(s) (206) may be interchangeably used with RF transceiver(s). In the present specification, the wireless device may represent a communication modem/circuit/chip.

Hereinafter, hardware elements of the wireless devices (100, 200) will be described in more detail. One or more protocol layers may be implemented by, without being limited to, one or more processors (102, 202). For example, the one or more processors (102, 202) may implement one or more layers (e.g., functional layers such as PHY, MAC, RLC, PDCP, RRC, and SDAP). The one or more processors (102, 202) may generate one or more Protocol Data Units (PDUs) and/or one or more Service Data Unit (SDUs) according to the descriptions, functions, procedures, proposals, methods, and/or operational flowcharts disclosed in this document. The one or more processors (102, 202) may generate messages, control information, data, or information according to the descriptions, functions, procedures, proposals, methods, and/or operational flowcharts disclosed in this document. The one or more processors (102, 202) may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers (106, 206). The one or more processors (102, 202) may receive the signals (e.g., baseband signals) from the one or more transceivers (106, 206) and obtain the PDUs, SDUs, messages, control information, data, or information according to the descriptions, functions, procedures, proposals, methods, and/or operational flowcharts disclosed in this document.

The one or more processors (102, 202) may be referred to as controllers, microcontrollers, microprocessors, or microcomputers. The one or more processors (102, 202) may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors (102, 202). The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors (102, 202) or stored in the one or more memories (104, 204) so as to be driven by the one or more processors (102, 202). The descriptions, functions, procedures, proposals, methods, and/or operational flowcharts disclosed in this document may be implemented using firmware or software in the form of code, instructions, and/or a set of instructions.

The one or more memories (104, 204) may be connected to the one or more processors (102, 202) and store various types of data, signals, messages, information, programs, code, instructions, and/or commands. The one or more memories (104, 204) may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories (104, 204) may be located at the interior and/or exterior of the one or more processors (102, 202). The one or more memories (104, 204) may be connected to the one or more processors (102, 202) through various technologies such as wired or wireless connection.

The one or more transceivers (106, 206) may transmit user data, control information, and/or radio signals/channels, mentioned in the methods and/or operational flowcharts of this document, to one or more other devices. The one or more transceivers (106, 206) may receive user data, control information, and/or radio signals/channels, mentioned in the descriptions, functions, procedures, proposals, methods, and/or operational flowcharts disclosed in this document, from one or more other devices. For example, the one or more transceivers (106, 206) may be connected to the one or more processors (102, 202) and transmit and receive radio signals. For example, the one or more processors (102, 202) may perform control so that the one or more transceivers (106, 206) may transmit user data, control information, or radio signals to one or more other devices. The one or more processors (102, 202) may perform control so that the one or more transceivers (106, 206) may receive user data, control information, or radio signals from one or more other devices. The one or more transceivers (106, 206) may be connected to the one or more antennas (108, 208) and the one or more transceivers (106, 206) may be configured to transmit and receive user data, control information, and/or radio signals/channels, mentioned in the descriptions, functions, procedures, proposals, methods, and/or operational flowcharts disclosed in this document, through the one or more antennas (108, 208). In this document, the one or more antennas may be a plurality of physical antennas or a plurality of logical antennas (e.g., antenna ports). The one or more transceivers (106, 206) may convert received radio signals/channels, and so on, from RF band signals into baseband signals in order to process received user data, control information, radio signals/channels, and so on, using the one or more processors (102, 202). The one or more transceivers (106, 206) may convert the user data, control information, radio signals/channels, and so on, processed using the one or more processors (102, 202) from the base band signals into the RF band signals. For this, the one or more transceivers (106, 206) may include (analog) oscillators and/or filters.

Figure 22:
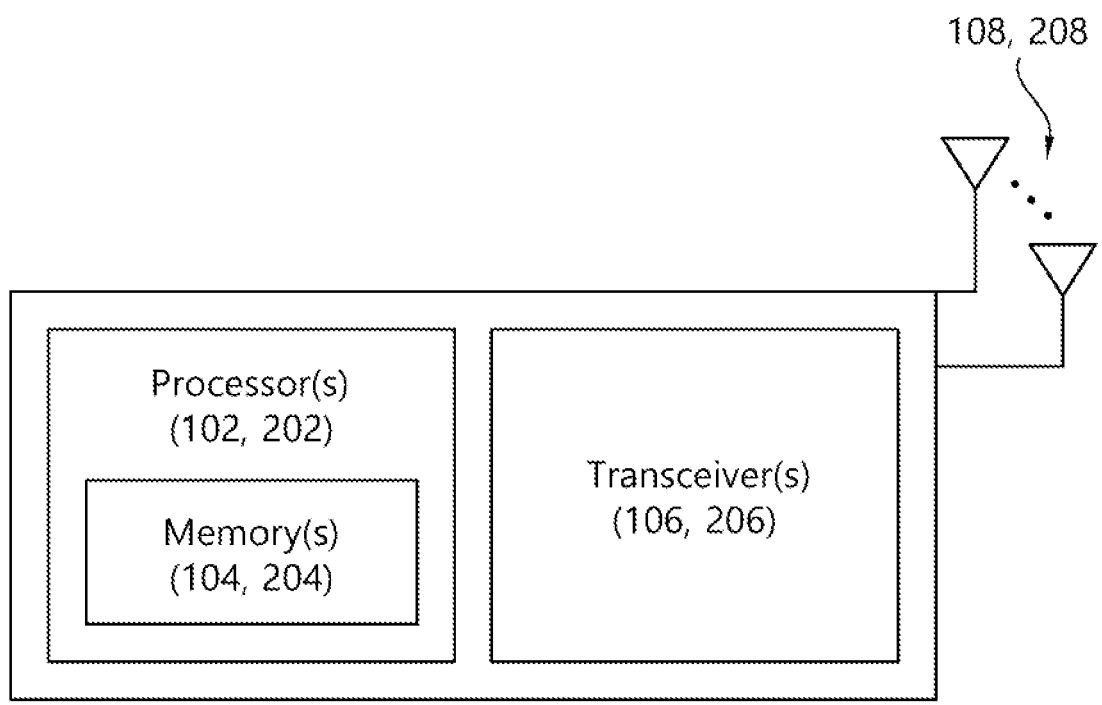
FIG. 22 shows another example of a wireless device applicable to the present specification.

FIG. 22 shows another example of a wireless device applicable to the present specification.

According to FIG. 22, the wireless device may include at least one processor (102, 202), at least one memory (104, 204), at least one transceiver (106, 206), and/or one or more antennas (108, 208).

As a difference between the example of the wireless device described above in FIG. 21 and the example of the wireless device in FIG. 22, in FIG. 21, the processors 102 and 202 and the memories 104 and 204 are separated, but in the example of FIG. 22, the memories 104 and 204 are included in the processors 102 and 202.

Here, a detailed description of the processors 102 and 202, the memories 104 and 204, the transceivers 106 and 206, and the one or more antennas 108 and 208 is as described above, in order to avoid unnecessary repetition of description, description of repeated description will be omitted.

Hereinafter, an example of a signal processing circuit to which the present specification is applied will be described in detail.

Figure 23:
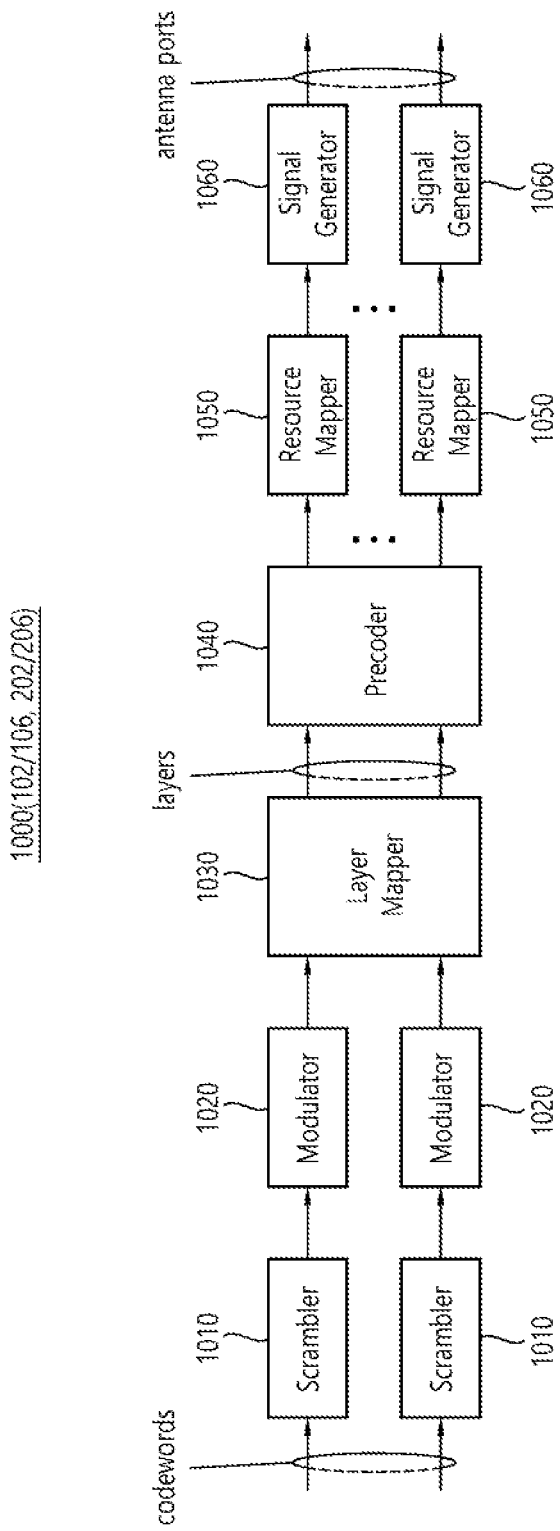
FIG. 23 shows a signal process circuit for a transmission signal according to an embodiment of the present specification.

FIG. 23 shows a signal process circuit for a transmission signal according to an embodiment of the present specification.

Referring to FIG. 23, a signal processing circuit (1000) may include scramblers (1010), modulators (1020), a layer mapper (1030), a precoder (1040), resource mappers (1050), and signal generators (1060). An operation/function of FIG. 23 may be performed, without being limited to, the processors (102, 202) and/or the transceivers (106, 206) of FIG. 21. Hardware elements of FIG. 23 may be implemented by the processors (102, 202) and/or the transceivers (106, 206) of FIG. 21. For example, blocks 1010-1060 may be implemented by the processors (102, 202) of FIG. 21. Alternatively, the blocks 1010-1050 may be implemented by the processors (102, 202) of FIG. 21 and the block 1060 may be implemented by the transceivers (106, 206) of FIG. 21.

Codewords may be converted into radio signals via the signal processing circuit (1000) of FIG. 23. Herein, the codewords are encoded bit sequences of information blocks. The information blocks may include transport blocks (e.g., a UL-SCH transport block, a DL-SCH transport block). The radio signals may be transmitted through various physical channels (e.g., a PUSCH and a PDSCH).

More specifically, the codewords may be converted into scrambled bit sequences by the scramblers (1010). Scramble sequences used for scrambling may be generated based on an initialization value, and the initialization value may include ID information of a wireless device. The scrambled bit sequences may be modulated to modulation symbol sequences by the modulators (1020). A modulation scheme may include pi/2-Binary Phase Shift Keying (pi/2-BPSK), m-Phase Shift Keying (m-PSK), and m-Quadrature Amplitude Modulation (m-QAM). Complex modulation symbol sequences may be mapped to one or more transport layers by the layer mapper (1030). Modulation symbols of each transport layer may be mapped (precoded) to corresponding antenna port(s) by the precoder (1040). Outputs z of the precoder (1040) may be obtained by multiplying outputs y of the layer mapper (1030) by an N*M precoding matrix W. Herein, N is the number of antenna ports, and M is the number of transport layers. The precoder (1040) may perform precoding after performing transform precoding (e.g., DFT) for complex modulation symbols. Additionally, the precoder (1040) may perform precoding without performing transform precoding.

The resource mappers (1050) may map modulation symbols of each antenna port to time-frequency resources. The time-frequency resources may include a plurality of symbols (e.g., a CP-OFDMA symbols and DFT-s-OFDMA symbols) in the time domain and a plurality of subcarriers in the frequency domain. The signal generators (1060) may generate radio signals from the mapped modulation symbols and the generated radio signals may be transmitted to other devices through each antenna. For this purpose, the signal generators (1060) may include Inverse Fast Fourier Transform (IFFT) modules, Cyclic Prefix (CP) inserters, Digital-to-Analog Converters (DACs), frequency uplink converters, and so on.

Signal processing procedures for a signal received in the wireless device may be configured in a reverse manner of the signal processing procedures (1010-1060) of FIG. 23. For example, the wireless devices (e.g., 100, 200 of FIG. 21) may receive radio signals from the exterior through the antenna ports/transceivers. The received radio signals may be converted into baseband signals through signal restorers. For this, the signal restorers may include frequency downlink converters, Analog-to-Digital Converters (ADCs), CP remover, and Fast Fourier Transform (FFT) modules. Subsequently, the baseband signals may be restored to codewords through a resource demapping procedure, a postcoding procedure, a demodulation processor, and a descrambling procedure. The codewords may be restored to original information blocks through decoding. Therefore, a signal processing circuit (not shown) for a reception signal may include signal restorers, resource demappers, a postcoder, demodulators, descramblers, and decoders.

Hereinafter, a usage example of the wireless to which the present specification is applied will be described in detail.

Figure 24:
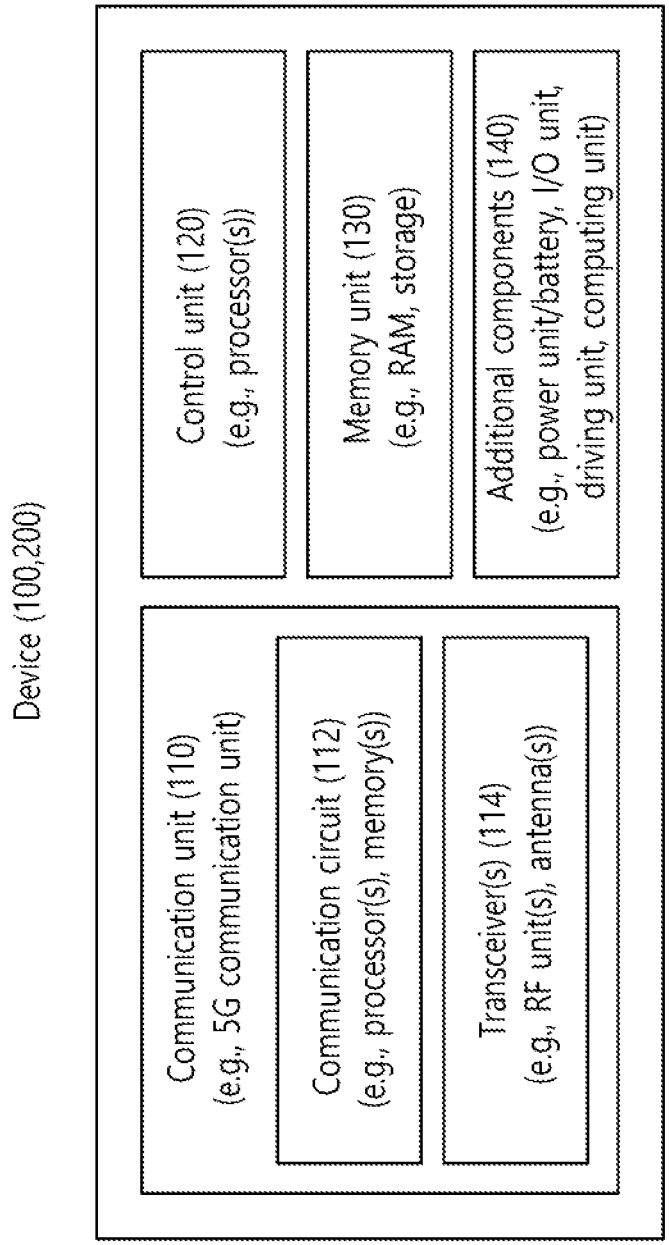
FIG. 24 shows another example of a wireless device according to an embodiment of the present specification.

FIG. 24 shows another example of a wireless device according to an embodiment of the present specification. The wireless device may be implemented in various forms according to a use-case/service (refer to FIG. 20).

Referring to FIG. 24, wireless devices (100, 200) may correspond to the wireless devices (100, 200) of FIG. 21 and may be configured by various elements, components, units/portions, and/or modules. For example, each of the wireless devices (100, 200) may include a communication unit (110), a control unit (120), a memory unit (130), and additional components (140). The communication unit may include a communication circuit (112) and transceiver(s) (114). For example, the communication circuit (112) may include the one or more processors (102, 202) and/or the one or more memories (104, 204) of FIG. 21. For example, the transceiver(s) (114) may include the one or more transceivers (106, 206) and/or the one or more antennas (108, 208) of FIG. 21. The control unit (120) is electrically connected to the communication unit (110), the memory (130), and the additional components (140) and controls overall operation of the wireless devices. For example, the control unit (120) may control an electric/mechanical operation of the wireless device based on programs/code/instructions/information stored in the memory unit (130). The control unit (120) may transmit the information stored in the memory unit (130) to the exterior (e.g., other communication devices) via the communication unit (110) through a wireless/wired interface or store, in the memory unit (130), information received through the wireless/wired interface from the exterior (e.g., other communication devices) via the communication unit (110).

The additional components (140) may be variously configured according to types of wireless devices. For example, the additional components (140) may include at least one of a power unit/battery, input/output (I/O) unit, a driving unit, and a computing unit. The wireless device may be implemented in the form of, without being limited to, the robot (100a of FIG. 20), the vehicles (100b-1, 100b-2 of FIG. 20), the XR device (100c of FIG. 20), the hand-held device (100d of FIG. 20), the home appliance (100e of FIG. 20), the IoT device (100f of FIG. 20), a digital broadcast terminal, a hologram device, a public safety device, an MTC device, a medicine device, a fintech device (or a finance device), a security device, a climate/environment device, the AI server/device (400 of FIG. 20), the BSs (200 of FIG. 20), a network node, and so on. The wireless device may be used in a mobile or fixed place according to a usage-example/service.

In FIG. 24, the entirety of the various elements, components, units/portions, and/or modules in the wireless devices (100, 200) may be connected to each other through a wired interface or at least a part thereof may be wirelessly connected through the communication unit (110). For example, in each of the wireless devices (100, 200), the control unit (120) and the communication unit (110) may be connected by wire and the control unit (120) and first units (e.g., 130, 140) may be wirelessly connected through the communication unit (110). Each element, component, unit/portion, and/or module within the wireless devices (100, 200) may further include one or more elements. For example, the control unit (120) may be configured by a set of one or more processors. As an example, the control unit (120) may be configured by a set of a communication control processor, an application processor, an Electronic Control Unit (ECU), a graphical processing unit, and a memory control processor. As another example, the memory (130) may be configured by a Random Access Memory (RAM), a Dynamic RAM (DRAM), a Read Only Memory (ROM)), a flash memory, a volatile memory, a non-volatile memory, and/or a combination thereof.

Hereinafter, an example of implementing FIG. 24 will be described in detail with reference to the drawings.

Figure 25:
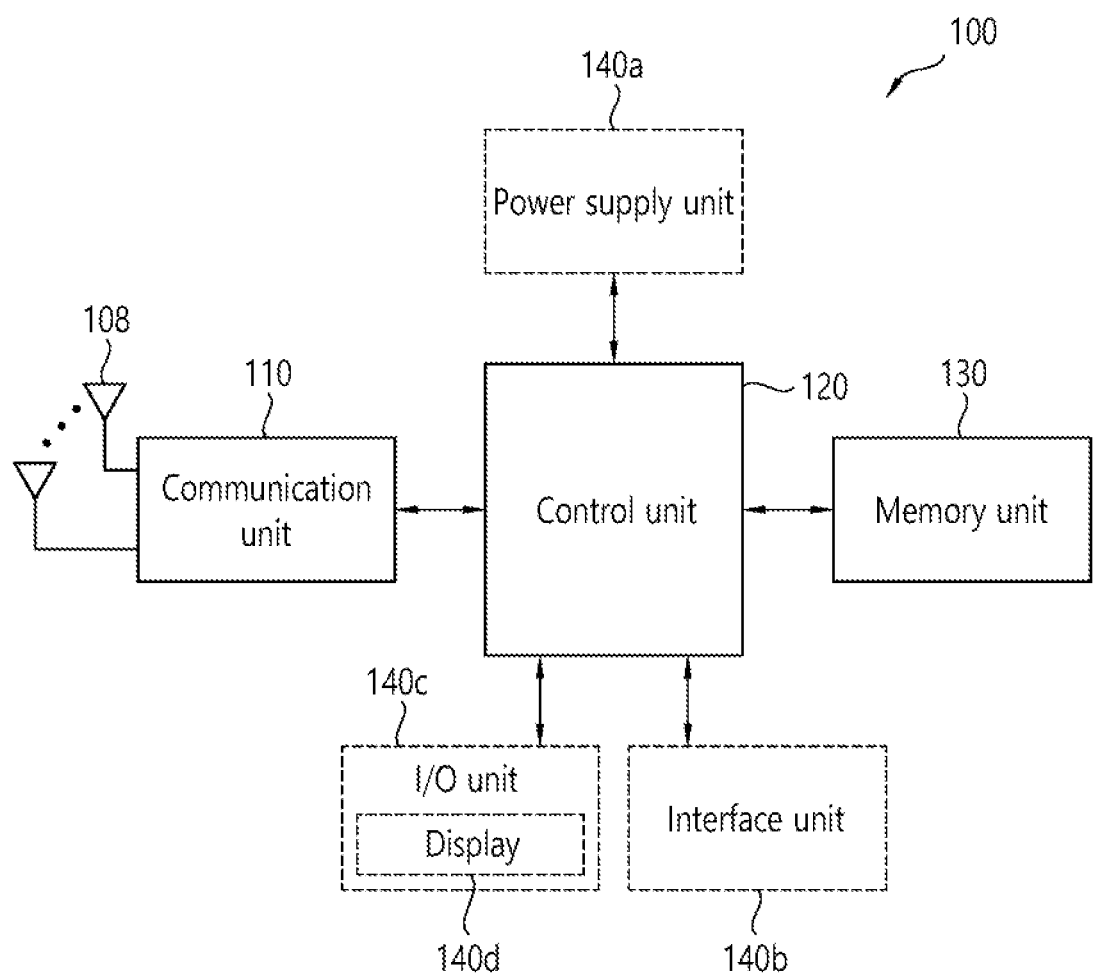
FIG. 25 shows a hand-held device to which the present specification is applied

FIG. 25 shows a hand-held device to which the present specification is applied. The hand-held device may include a smartphone, a smartpad, a wearable device (e.g., a smartwatch or a smartglasses), or a portable computer (e.g., a notebook). The hand-held device may be referred to as a mobile station (MS), a user terminal (UT), a Mobile Subscriber Station (MSS), a Subscriber Station (SS), an Advanced Mobile Station (AMS), or a Wireless Terminal (WT).

Referring to FIG. 25, a hand-held device (100) may include an antenna unit (108), a communication unit (110), a control unit (120), a memory unit (130), a power supply unit (140a), an interface unit (140b), and an I/O unit (140c). The antenna unit (108) may be configured as a part of the communication unit (110). Blocks 110-130/140a-140c correspond to the blocks 110-130/140 of FIG. 24, respectively.

The communication unit (110) may transmit and receive signals (e.g., data and control signals) to and from other wireless devices or BSs. The control unit (120) may perform various operations by controlling constituent elements of the hand-held device (100). The control unit (120) may include an Application Processor (AP). The memory unit (130) may store data/parameters/programs/code/instructions (or commands) needed to drive the hand-held device (100). The memory unit (130) may store input/output data/information. The power supply unit (140a) may supply power to the hand-held device (100) and include a wired/wireless charging circuit, a battery, and so on. The interface unit (140b) may support connection of the hand-held device (100) to other external devices. The interface unit (140b) may include various ports (e.g., an audio I/O port and a video I/O port) for connection with external devices. The I/O unit (140c) may input or output video information/signals, audio information/signals, data, and/or information input by a user. The I/O unit (140c) may include a camera, a microphone, a user input unit, a display unit (140d), a speaker, and/or a haptic module.

As an example, in the case of data communication, the I/O unit (140c) may obtain information/signals (e.g., touch, text, voice, images, or video) input by a user and the obtained information/signals may be stored in the memory unit (130). The communication unit (110) may convert the information/signals stored in the memory into radio signals and transmit the converted radio signals to other wireless devices directly or to a BS. The communication unit (110) may receive radio signals from other wireless devices or the BS and then restore the received radio signals into original information/signals. The restored information/signals may be stored in the memory unit (130) and may be output as various types (e.g., text, voice, images, video, or haptic) through the I/O unit (140c).

Figure 26:
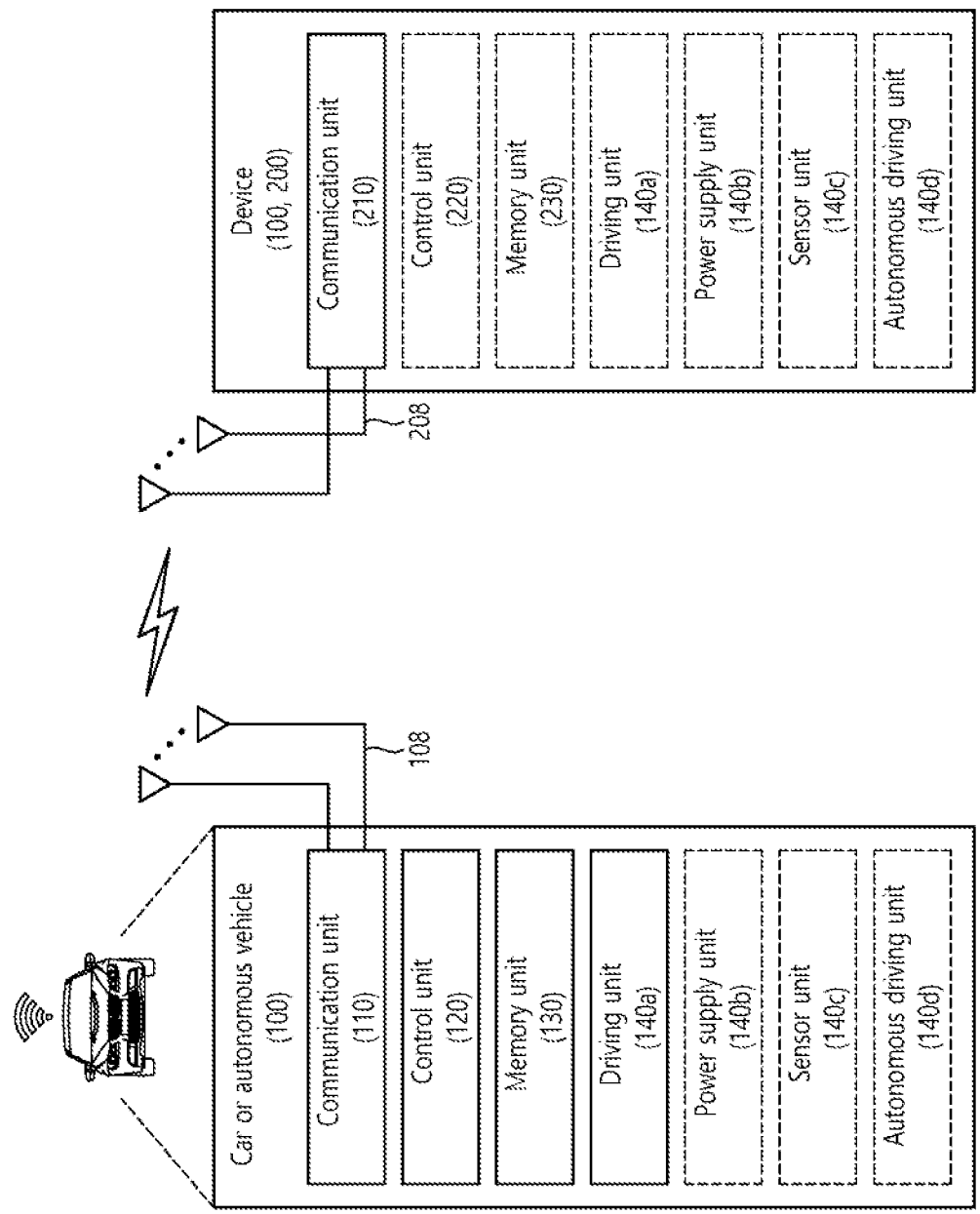
FIG. 26 shows a vehicle or an autonomous vehicle to which the present specification is applied.

FIG. 26 shows a vehicle or an autonomous vehicle to which the present specification is applied. The vehicle or autonomous vehicle may be implemented by a mobile robot, a car, a train, a manned/unmanned Aerial Vehicle (AV), a ship, and so on.

Referring to FIG. 26, a vehicle or autonomous vehicle (100) may include an antenna unit (108), a communication unit (110), a control unit (120), a driving unit (140a), a power supply unit (140b), a sensor unit (140c), and an autonomous driving unit (140d). The antenna unit (108) may be configured as a part of the communication unit (110). The blocks 110/130/140a-140d correspond to the blocks 110/130/140 of FIG. 24, respectively.

The communication unit (110) may transmit and receive signals (e.g., data and control signals) to and from external devices such as other vehicles, BSs (e.g., gNBs and road side units), and servers. The control unit (120) may perform various operations by controlling elements of the vehicle or the autonomous vehicle (100). The control unit (120) may include an Electronic Control Unit (ECU). The driving unit (140a) may cause the vehicle or the autonomous vehicle (100) to drive on a road. The driving unit (140a) may include an engine, a motor, a powertrain, a wheel, a brake, a steering device, and so on. The power supply unit (140b) may supply power to the vehicle or the autonomous vehicle (100) and include a wired/wireless charging circuit, a battery, and so on. The sensor unit (140c) may obtain a vehicle state, ambient environment information, user information, and so on. The sensor unit (140c) may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit (140d) may implement technology for maintaining a lane on which a vehicle is driving, technology for automatically adjusting speed, such as adaptive cruise control, technology for autonomously driving along a determined path, technology for driving by automatically setting a path if a destination is set, and so on.

For example, the communication unit (110) may receive map data, traffic information data, and so on, from an external server. The autonomous driving unit (140d) may generate an autonomous driving path and a driving plan from the obtained data. The control unit (120) may control the driving unit (140a) such that the vehicle or the autonomous vehicle (100) may move along the autonomous driving path according to the driving plan (e.g., speed/direction control). In the middle of autonomous driving, the communication unit (110) may aperiodically/periodically obtain recent traffic information data from the external server and obtain surrounding traffic information data from neighboring vehicles. In the middle of autonomous driving, the sensor unit (140c) may obtain a vehicle state and/or surrounding environment information. The autonomous driving unit (140d) may update the autonomous driving path and the driving plan based on the newly obtained data/information. The communication unit (110) may transfer information on a vehicle position, the autonomous driving path, and/or the driving plan to the external server. The external server may predict traffic information data using AI technology, and so on, based on the information collected from vehicles or autonomous vehicles and provide the predicted traffic information data to the vehicles or the autonomous vehicles.

Claims in the present specification may be combined in various ways. For instance, technical features in method claims of the present specification may be combined to be implemented or performed in an apparatus (or device), and technical features in apparatus claims may be combined to be implemented or performed in a method. Further, technical features in method claim(s) and apparatus claim(s) may be combined to be implemented or performed in an apparatus. Further, technical features in method claim(s) and apparatus claim(s) may be combined to be implemented or performed in a method.

What is claimed is:

1. A method comprising:
   performing, by a user equipment (UE), an initial access with a base station;
   receiving, by the UE from the base station, at least one CORESET configuration information; and
   monitoring, by the UE, a set of physical control channel (PDCCH) on a candidates in a CORESET configured based on the at least one CORESET configuration information,
   wherein a duration of the CORESET on a time axis is 4 or more symbols,
   wherein the CORESET comprises at least 2 sub-CORESETs, a duration of each of the at least 2 sub-CORESETs being smaller than the duration of the CORESET and a sum of durations of the at least 2 sub-CORESETs being same as the duration of the CORESET, and wherein indexing of each of a plurality of control channel elements (CCEs) mapped to the CORESET is performed by alternating a first sub-CORESET and a second sub-CORESET of the at least 2 sub-CORESETs.

2. The method of claim 1, wherein the CORESET includes the first sub-CORESET and the second sub-CORESET,
wherein a duration of the first sub-CORESET consists of 1 to 3 symbols,
wherein a duration of the second sub-CORESET consists of 1 to 3 symbols,
wherein a sum of the duration of the first sub-CORESET and the duration of the second sub-CORESET is same as the duration of the CORESET.

3. The method of claim 1, wherein the at least one CORESET configuration information includes first CORESET configuration information and second CORESET configuration information,
wherein the first sub-CORESET is configured based on the first CORESET configuration information,
wherein the second sub-CORESET is configured based on the second CORESET configuration information.

4. The method of claim 1,
wherein each CCE included in the plurality of CCEs consists of 6 resource element groups (REGs),
wherein each of the 6 REGs consists of one resource block on a frequency axis and one symbol on the time axis.

5. The method of claim 1, wherein, based on number of CCEs for the first sub-CORESET being different from a number of CCEs for the second sub-CORESET, the indexing of each of the plurality of CCEs is performed on the first sub-CORESET and the second CORESET based on a ratio between a number of CCEs for the first sub-CORESET and a number of the CCEs for the second sub-CORESET.

6. The method of claim 1, wherein the at least one CORESET configuration information is a single CORESET configuration information,
wherein the single CORESET configuration information informs that the duration of the CORESET is 4 or more.

7. The method of claim 1, wherein the plurality of CCEs is mapped to the CORESET,
wherein a number of resource element groups (REGs) included in each of the plurality of CCEs is configured based on a number of symbols constituting the duration.

8. The method of claim 1, wherein the at least one CORESET configuration information includes information informing whether a demodulation reference signal (DMRS) for the UE is allocated to a plurality of symbols or allocated only to a single symbol.

9. A user equipment (UE) comprising:
at least one transceiver;
at least one memory; and
at least one processor operatively coupled with the at least one memory and at least one transceiver, wherein the at least one memory stores instructions that, based on being executed by the at least one processor, cause the at least one processor to perform operations comprising:
performing an initial access with a base station;
receiving, from the base station, at least one control resource set (CORESET) configuration information; and
monitoring a set of physical control channel (PDCCH) candidates in a CORESET configured based on the at least one CORESET configuration information,
wherein a duration of the CORESET on a time axis is 4 or more symbols,
wherein the CORESET comprises at least 2 sub-CORESETs, a duration of each of the at least 2 sub-CORESETs being smaller than the duration of the CORESET and a sum of durations of the at least 2 sub-CORESETs being same as the duration of the CORESET, and
wherein indexing of each of a plurality of control channel elements (CCEs) mapped to the CORESET is performed by alternating a first sub-CORESET and a second sub-CORESET of the at least 2 sub-CORESETs.

10. A base station comprising:
at least one transceiver;
at least one memory; and
at least one processor operatively coupled with the at least one memory and at least one transceiver, wherein the at least one memory stores instructions that, based on being executed by the at least one processor, cause the at least one processor to perform operations comprising:
performing an initial access with a user equipment (UE); and
transmitting, to the UE, at least one CORESET configuration information,
wherein a physical control channel (PDCCH) is transmitted on a CORESET configured based on the at least one CORESET configuration information,
wherein a duration of the CORESET on a time axis is 4 or more symbols,
wherein the CORESET comprises at least 2 sub-CORESETs, a duration of each of the at least 2 sub-CORESETs being smaller than the duration of the CORESET and a sum of durations of the at least 2 sub-CORESETs being same as the duration of the CORESET, and
wherein indexing of each of a plurality of control channel elements (CCEs) mapped to the CORESET is performed by alternating a first sub-CORESET and a second sub-CORESET of the at least 2 sub-CORESETs.

* * * * *